US012586907B2

(12) United States Patent
Kong et al.

(10) Patent No.: US 12,586,907 B2
(45) Date of Patent: Mar. 24, 2026

(54) REACTANCE-LOADED SEQUENTIAL-PHASE FEED NETWORK FOR A HIGHLY COMPACT WIDEBAND ON-CHIP CIRCULARLY POLARIZED ANTENNA

(71) Applicant: CITY UNIVERSITY OF HONG KONG, Kowloon (HK)

(72) Inventors: Shangcheng Kong, Kowloon (HK); Kam Man Shum, Tai Po (HK); Chi Hou Chan, Kowloon (HK)

(73) Assignee: CITY UNIVERSITY OF HONG KONG, Hong Kong (HK)

( * ) Notice: Subject to any disclaimer, the term of this patent is extended or adjusted under 35 U.S.C. 154(b) by 35 days.

(21) Appl. No.: 18/434,427

(22) Filed: Feb. 6, 2024

(65) Prior Publication Data

US 2025/0253534 A1 Aug. 7, 2025

(51) Int. Cl.
*H01Q 9/04* (2006.01)
*H01Q 21/06* (2006.01)

(52) U.S. Cl.
CPC ......... *H01Q 9/0428* (2013.01); *H01Q 9/0414* (2013.01); *H01Q 21/065* (2013.01)

(58) Field of Classification Search
CPC ... H01Q 9/0428; H01Q 9/0414; H01Q 21/065
See application file for complete search history.

(56) References Cited

U.S. PATENT DOCUMENTS

| | | | |
|---|---|---|---|
| 9,391,375 | B1 | 7/2016 | Bales et al. |
| 9,590,319 | B2 | 3/2017 | Orban et al. |
| 10,170,839 | B2 | 1/2019 | Xue et al. |
| 11,539,146 | B2 | 12/2022 | Chieh et al. |

FOREIGN PATENT DOCUMENTS

| | | | |
|---|---|---|---|
| CN | 112909531 | B | 5/2022 |
| CN | 114709594 | A | 7/2022 |
| CN | 115377690 | A | 11/2022 |

OTHER PUBLICATIONS

Zhengyan Lu, Le Yang, and Lingsheng Yang, Design of a Broadband Circularly Polarized Antenna Array, Progress In Electromagnetics Research M, vol. 82, 195-203, 2019.*

(Continued)

*Primary Examiner* — Dieu Hien T Duong
(74) *Attorney, Agent, or Firm* — Merchant & Gould P.C.

(57) ABSTRACT

A circularly polarized antenna that includes a plurality of radiating elements configured in a rotationally symmetric pattern, and a feed network connected to the plurality of radiating elements. Each radiating element contains a patch element, and a shorting wall connected to the patch element and adapted to short the same. Unlike traditional sequential-phase feed, which simply relies on the physical length of the delay line to achieve phase progression, the reactance-loaded feed line strategically utilizes the equivalent capacitor and inductor to shift the phase. This method eliminates the reliance on the long delay lines and realizes stable phase differences over a wide bandwidth.

22 Claims, 19 Drawing Sheets

(56) References Cited

OTHER PUBLICATIONS

Hau Wah Lai, Ka Ming Mak, and Ka Fai Chan, Novel Aperture-Coupled Microstrip-Line Feed for Circularly Polarized Patch Antenna, Progress In Electromagnetics Research, vol. 144, 1-9, 2014.*

C. T. Sah, "Characteristics of the metal-Oxide-semiconductor transistors," IEEE Trans. Electron Devices, vol. 11, No. 7, pp. 324-345, 1964.

P. Zhou, J. Chen, S. Tang et al., "Research on silicon-based terahertz communication integrated circuits," Chin. J. Electron., vol. 31, No. 3, pp. 516-533, 2022.

H. Elayan, O. Amin, B. Shihada et al., "Terahertz Band: The Last Piece of RF Spectrum Puzzle for Communication Systems," IEEE Open J. Commun. Soc., vol. 1, pp. 1-32, 2020.

S. Hu, Y.-Z. Xiong, B. Zhang et al., "A SiGe BiCMOS transmitter/receiver chipset with on-chip SIW antennas for terahertz applications," IEEE J. Solid-State Circuits, vol. 47, No. 11, pp. 2654-2664, 2012.

H. M. Cheema, and A. Shamim, "The last barrier: on-chip antennas," IEEE Microw. Mag., vol. 14, No. 1, pp. 79-91, 2013.

S. Kong, K. M. Shum, C. Yang et al., "Wide Impedance-Bandwidth and Gain-Bandwidth Terahertz On-Chip Antenna With Chip-Integrated Dielectric Resonator," IEEE Trans. Antennas Propag., vol. 69, No. 8, pp. 4269-4278, 2021.

P. Nazari, S. Jafarlou, and P. Heydari, "19.1 A fundamental-frequency 114GHz circular-polarized radiating element with 14dBm EIRP,—99.3 dBc/Hz phase-noise at 1MHz offset and 3.7% peak efficiency," in 2017 IEEE Int. Solid-State Circuits Conf., 2017, pp. 322-323.

X. Chen, M. I. W. Khan, X. Yi et al., "A 140GHz transceiver with integrated antenna, inherent-low-loss duplexing and adaptive self-interference cancellation for FMCW monostatic radar," in 2022 IEEE Int. Solid-State Circuits Conf., 2022, pp. 80-82.

K. Statnikov, J. Grzyb, N. Sarmah et al., "A 240-GHz circularly polarized FMCW radar based on a SiGe transceiver with a lens-coupled on-chip antenna," Int. J. Microw. Wireless Technol., vol. 7, No. 3-4, pp. 415-423, 2015.

J. Grzyb, K. Statnikov, N. Sarmah et al., "A 210-270 GHz circularly polarized FMCW radar with a single-lens-coupled SiGe HBT chip," IEEE Trans. THz Sci. Technol, vol. 6, No. 6, pp. 771-783, 2016.

Y. Shang, H. Yu, H. Fu et al., "A 239-281 GHz CMOS receiver with on-chip circular-polarized substrate integrated waveguide antenna for sub-terahertz imaging," IEEE Trans. THz Sci. Technol, vol. 4, No. 6, pp. 686-695, 2014.

B. Goettel, W. Winkler, A. Bhutani et al., "Packaging Solution for a Millimeter-Wave System-on-Chip Radar," IEEE Trans. Compon., Packag., Manuf. Technol., vol. 8, No. 1, pp. 73-81, 2018.

W. Lin, R. W. Ziolkowski, W. A. Ahmad et al., "320 GHz on-chip circularly-polarized antenna array realized with 0.13 μm BiCMOS technology," in 2020 IEEE Int. Symp. Antennas Propag. & N. Am. Radio Sci. Meeting., 2020, pp. 1467-1468.

S. Kong, L. Lv, S. Hu et al., "Terahertz one-port de-embedding method for extracting dielectric constant of SiO2 in standard CMOS," IEEE Trans. THz Sci. Technol, vol. 12, No. 5, pp. 499-509, 2022.

M. Alibakhshikenari, B. S. Virdee, M. Khalily et al., "High-gain on-chip antenna design on silicon layer with aperture excitation for terahertz applications," IEEE Antennas Wireless Propag. Lett., vol. 19, No. 9, pp. 1576-1580, 2020.

X.-Y. Bao, Y.-X. Guo, and Y.-Z. Xiong, "60-GHz AMC-Based Circularly Polarized On-Chip Antenna Using Standard 0.18-μm CMOS Technology," IEEE Trans. Antennas Propag., vol. 60, No. 5, pp. 2234-2241, 2012.

S. Mandal, H. Singh, S. K. Mandal et al., "A 24 GHz circularly polarized on-chip antenna for short-range communication application," Scientia Iranica, 2022.

J. Pourahmadazar, R. Karimian, and T. A. Denidni, "A High Data-Rate Kiosk Application circularly polarized fractal antenna for mm-wave band radio with 0.18 μm CMOS technology," in 2016 10th Eur. Conf. Antennas Propag., 2016, pp. 1-4.

L. Wang, and W. Z. Sun, "A 60-GHz differential-fed circularly polarized on-chip antenna based on 0.18-μm COMS technology with AMC structure," in IET Int. Radar Conf. 2015., 2015, pp. 1-4.

T.-Y. Lin, T. Chiu, and D.-C. Chang, "Design of V-band wide-beamwidth circularly polarized wire-bond antenna," IEEE Trans. Compon. Pack. Manuf. Technol., vol. 8, No. 2, pp. 261-268, 2018.

K. Guo, and P. Reynaert, "A 510-to-545 GHz Radiating Source With an SIW-Based Harmonic Power Extractor in 40-nm CMOS," IEEE Trans. THz Sci. Technol., vol. 12, No. 3, pp. 245-256, 2022.

B. Sievert, J. Wittemeier, J. T. Svejda et al., "Bandwidth enhanced circularly polarized mm-wave antenna with on-chip ground plane," IEEE Trans. Antennas Propag., vol. 70, No. 10, pp. 9139-9148, 2022.

D. Titz, F. Ferrero, and C. Luxey, "Development of a millimeter-wave measurement setup and dedicated techniques to characterize the matching and radiation performance of probe-fed antennas [measurements corner]," IEEE Antennas Propag. Mag., vol. 54, No. 4, pp. 188-203, 2012.

* cited by examiner

REACTANCE-LOADED SEQUENTIAL-PHASE FEED NETWORK FOR A HIGHLY COMPACT WIDEBAND ON-CHIP CIRCULARLY POLARIZED ANTENNA

FIELD OF INVENTION

This invention relates to on-chip antennas, and in particular to on-chip circularly polarized antennas.

BACKGROUND OF INVENTION

As a predominant technology for manufacturing integrated circuits, the complementary metal-oxide semiconductor (CMOS) technology has gained widespread adoption and popularity due to advantages such as low power consumption, high speed, maturity, and scalability. Owing to improvements in both the cut-off frequency and maximum oscillation frequency of transistors, CMOS technology has emerged as a compelling choice for integrating terahertz (THz) components and spurred significant interest in system-on-chip (SoC) and antenna-on-chip (AoC) solutions. Circularly polarized (CP) antennas play a significant role in many applications, offering benefits such as robust mitigation of multipath interference, the ability to sustain consistent transmission regardless of antenna orientation, and reduced susceptibility to ghost targets and receiver jamming. With the assistance of CMOS technology and extremely short wavelengths at THz frequencies, CP antennas can be seamlessly integrated with RF and digital circuits on a single chip. The fusion of THz technology, CP antennas, and CMOS technology opens up new avenues for future research and development in scenarios including high-resolution radar imaging, short-range communication, automotive systems, biomedicine, non-destructive testing, and inter-satellite communications.

However, the design of on-chip CP antennas faces many challenges. Due to the extremely thin dioxide layer in the Back-End-of-Line (BEOL) process, the axial-ratio bandwidth of conventional on-chip CP antennas is typically limited to within 5-6%. Therefore, some antennas utilize the silicon base in the CMOS process to enhance the bandwidth of on-chip CP antennas, achieving up to 16% AR (axial-ratio) bandwidth. However, using the silicon base introduces various issues, including reduced radiation efficiency, surface waves, distorted radiation, and potential interference with active devices in the Front-End-of-Line (FEOL) process. The sequential-phase feed technique is a promising alternative to expand the antenna bandwidth without using the silicon base. Notably, this method does not require the antenna element to be CP, and the AR bandwidth is determined mostly by the sequential-phase feed network, thereby reducing the design difficulty for wide AR bandwidth. This method is widely used in monostatic and quasi-monostatic radars and is often paired with a duplexer or coupler to distinguish between transmitted and received signals. However, due to employing a large antenna array and complex feed network, this approach usually leads to a large size. The phase difference between adjacent outputs is typically achieved through delayed transmission lines. For instance, a 90° phase difference requires a quarter-wavelength transmission line. Consequently, this method is often not cost-effective and is disadvantageous for miniaturization and integration. Additionally, the impedance bandwidth is typically narrow due to the constraints imposed by the thin $SiO_2$ (silicon oxide) layer thickness. Even with a well-designed feed network, the overlapped bandwidth between impedance and AR bandwidth is usually below 10%. Due to the above reasons, the development of on-chip CP antennas has been largely restricted, with research noticeably lacking compared to on-chip linearly polarized (LP) antennas. Therefore, there is a significant demand for a compact, wideband, on-chip CP antenna design.

SUMMARY OF INVENTION

Accordingly, the invention in one aspect provides a circularly polarized antenna that includes a plurality of radiating elements configured in a rotationally symmetric pattern, and a feed network connected to the plurality of radiating elements. Each radiating element contains a patch element, and a shorting wall connected to the patch element and adapted to short the same.

In some embodiments, the circularly polarized antenna further includes a ground layer. For each radiating element the shorting wall is positioned between a corresponding patch element and the ground layer, and connected to both the patch element and the ground layer.

In some embodiments, the shorting wall contains a plurality of layers.

In some embodiments, the shorting wall contains ten layers.

In some embodiments, the patch element of each radiating elements has a substantially rectangular shape.

In some embodiments, for each radiating element the shorting wall connects to the patch element substantially at a first side of the patch element. The feed network is connected to the patch element substantially at a second side of the patch element that is opposite to the first side.

In some embodiments, for each radiating element a projection of the shorting wall on the patch element has a substantially "T" shape. The shorting wall has a first segment connected to the patch element at a first side thereof, and a second segment perpendicular to the first segment and extending from the first segment toward a center of the patch element.

In some embodiments, the feed network contains, for each radiating element, a corresponding output arm that is connected to the radiating element. The output arm extends along a direction substantially parallel to that of the first segment.

In some embodiments, the first segment of the shorting wall has the same length as a dimension of the first side of the patch element.

In some embodiments, the patch element of each radiating element is formed with a rectangular notch at a corner of the rectangular shape. The feed network is connected to the patch element near the rectangular notch.

In some embodiments, for each radiating element the ground layer is formed with a respective aperture that has a shape corresponding to that of the shorting wall. The aperture receives partially the shorting wall therein.

In some embodiments, the circularly polarized antenna includes four radiating elements, with a 90° input phase difference between adjacent radiating elements.

In another aspect of the invention, there is provided a circularly polarized antenna, which contains a plurality of radiating elements configured in a rotationally symmetric pattern, and a feed network connected to the plurality of radiating elements. The feed network contains a core portion, and a plurality of output arms each corresponding to one of the plurality of radiating elements. The plurality of output arms is coupled to the core portion. The plurality of output arms is configured in a rotationally symmetric pattern.

In some embodiments, the core portion has a substantial square-ring shape.

In some embodiments, the core portion has unequal widths along a direction of extension of the core portion.

In some embodiments, the core portion contains a parallel-plate capacitor.

In some embodiments, the parallel-plate capacitor is located in front of a corresponding one of the output arms along a signal transmission path of the circularly polarized antenna.

In some embodiments, the parallel-plate capacitor contains a first portion located in a same layer as remaining part of the core portion, as well as a second portion parallel to and located below the first portion.

In some embodiments, the output arms are in the same layer as the first portion of the parallel-plate capacitor.

In some embodiments, the circularly polarized antenna contains four radiating elements, with a 90° input phase difference between adjacent radiating elements. The circularly polarized antenna contains three parallel-plate capacitors corresponding to first three radiating elements along a signal transmission path of the circularly polarized antenna.

In some embodiments, the core portion is fed by a feeding line that extends in a same layer as the core portion.

In some embodiments, the feeding line extends along a first direction. The core structure is shorted by a shorting line which extends along a second direction that is perpendicular to the first direction.

In some embodiments, the shorting line passes through a shorting via formed at substantially a center of the core portion, and connects to a ground layer below the feed network.

Embodiments of the invention thus provide wideband on-chip circularly polarized antennas featuring high compactness, wide band, and low profile. The antennas involve significant refinements of both the feed network and the radiating element. A reactance-loaded sequential-phase feed network is proposed to generate phase difference. Unlike traditional sequential-phase feed, which simply relies on the physical length of the delay line to achieve phase progression, the reactance-loaded feed line strategically utilizes equivalent capacitor(s) and inductor(s) to shift the phase. This method eliminates the reliance on the long delay lines and realizes stable phase differences over a wide bandwidth. The reactance-loading concept is versatile, applicable not only in sequential-phase feeding but also in any design requiring phase delay, such as hybrids and couplers. Antennas according to embodiments of the invention can be used in future 6G wireless communications, offering enhanced spectral and energy efficiency. Furthermore, they can also be used in Internet of Thing (IoT), sensing, imaging, and short-range high data-rate communication.

BRIEF DESCRIPTION OF FIGURES

The foregoing and further features of the present invention will be apparent from the following description of embodiments which are provided by way of example only in connection with the accompanying figures, of which.

DETAILED DESCRIPTION

FIGS. 1-4*b* show a wideband on-chip circularly polarized antenna according to a first embodiment of the invention.

The antenna is a 425-GHz wideband on-chip CP antenna with a highly compact sequential-phase feed network. This antenna utilizes equivalent capacitor(s) and inductor(s) to shift the phase, leading to a remarkably compact feed network and wide AR bandwidth. Furthermore, radiating elements in the antenna are designed to resonate in unique half $TM_{01}$ and quarter $TE_{201}$ modes, significantly reducing the size and expanding the impedance bandwidth.

Figure 1:
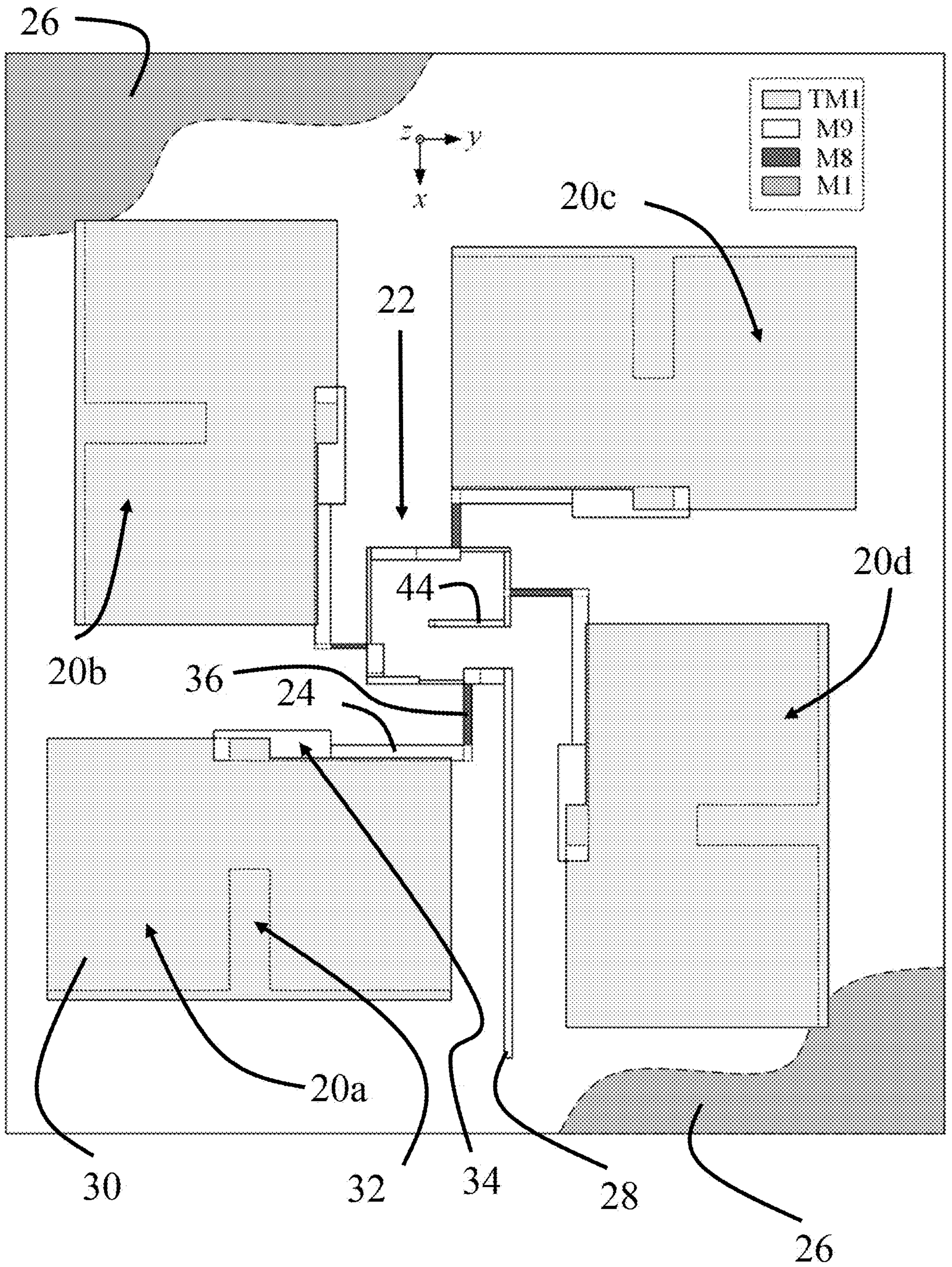
FIG. 1 is a top view of a wideband on-chip circularly polarized antenna according to one embodiment of the invention.

As best shown in FIG. 1, the antenna contains two major components, including a reactance-loaded sequential-phase feed network that includes a core portion 22 and four output arms 24 connected to the core portion 22, and a plurality of radiating elements 20*a*, 20*b*, 20*c*, 20*d*. The four radiating elements 20*a*, 20*b*, 20*c*, 20*d* are arranged in a rotationally symmetric pattern around the core portion 22, and so are the four output arms 24. The radiating element 20*a* is the first radiating element along the signal transmission path of the antenna (i.e., the path starting from a feeding line 28 to an end stub 44), and the next one is the radiating element 20*b*, and so on. The four radiating elements 20*a*, 20*b*, 20*c*, 20*d* have similar structures, and each of the radiating elements 20*a*, 20*b*, 20*c*, 20*d* is connected to the feed network by a respective output arm 24.

The core portion 22 has a substantially square-ring shape, although it is not a fully closed square shape as will be described in more details later. The four output arms 24 are each connected to a different side of the square shape by a connecting line 36. The feed network ensures that each consecutive pair of the radiating elements 20*a*, 20*b*, 20*c*, 20*d* is provided with a predetermined input phase difference, thus achieving sequential phasing. In particular, the antenna as shown in FIG. 1 incorporates a structure of four radiating elements 20*a*, 20*b*, 20*c*, 20*d* with a 90° input phase difference between adjacent elements to achieve sequential rotation for circular polarization. All the components of the antenna mentioned above are placed above a ground layer 26, and the feed network is shorted to the ground layer 26 as will be described below. On the other hand, the antenna is fed by the feeding line 28, which is in turn connected to on-chip circuits (not shown) for integration, or for example a GSG (ground-signal-ground) probe (not shown) for testing.

Figure 2:
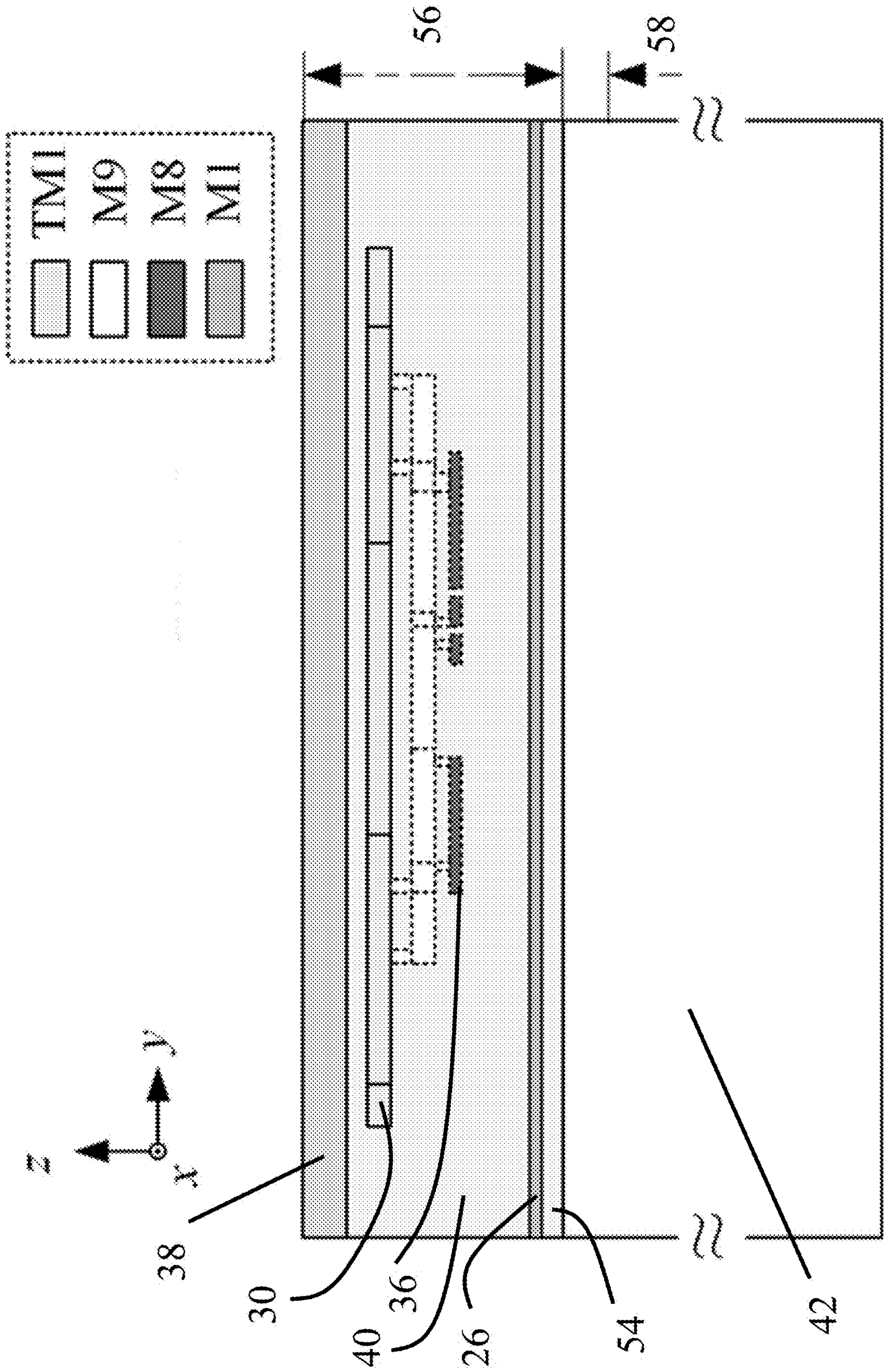
FIG. 2 is a side view of the antenna of FIG. 1, which shows also a passivation layer and a silicon substrate.

As shown in FIG. 2, the antenna is laid out in a first $SiO_2$ layer 40 for example during a BEOL process, and four metallic layers are primarily used for the antenna's structure: TM1 for the radiating elements 20*a*, 20*b*, 20*c*, 20*d*, M8 for connecting lines 36, M9 for the feed network and other transmission lines, and M1 as the ground layer 26. However, it should be noted that there are in total eight layers between M1 and M9, including M8, but FIG. 2 does not show the other layers (M2-M7) for the sake of brevity. TM1 is the topmost layer, and M1 is the bottommost layer (which is the ground layer 26). In other words, there are in total ten layers for the antenna including TM1 and M1. Above the first $SiO_2$ layer 40, there is a passivation layer 38 which is a front protective layer that is added to the surface of the antenna to prevent impurities from entering the antenna and causing damage. In practical processing, depending on the specific technology, the first $SiO_2$ layer 40 is typically composed of multiple sub-layers. Underneath the ground layer 26 there is a second $SiO_2$ layer 54. All metal layers from M1 to TM1 are embedded within the silicon dioxide dielectric layer. The passivation layer 38 and the second $SiO_2$ layer 54 delimit a passive region 56 of the on-chip device, which as mentioned above may be fabricated using the BEOL process. Underneath the second $SiO_2$ layer 54 there is a substrate 42 that is made of silicon, and the substrate 42 may be a common substrate for any components other than the circularly polarized antenna on the on-chip device. The substrate 42 defines an active region 58 of the on-chip device, and may be fabricated using for example a FEOL process.

Figure 3B:
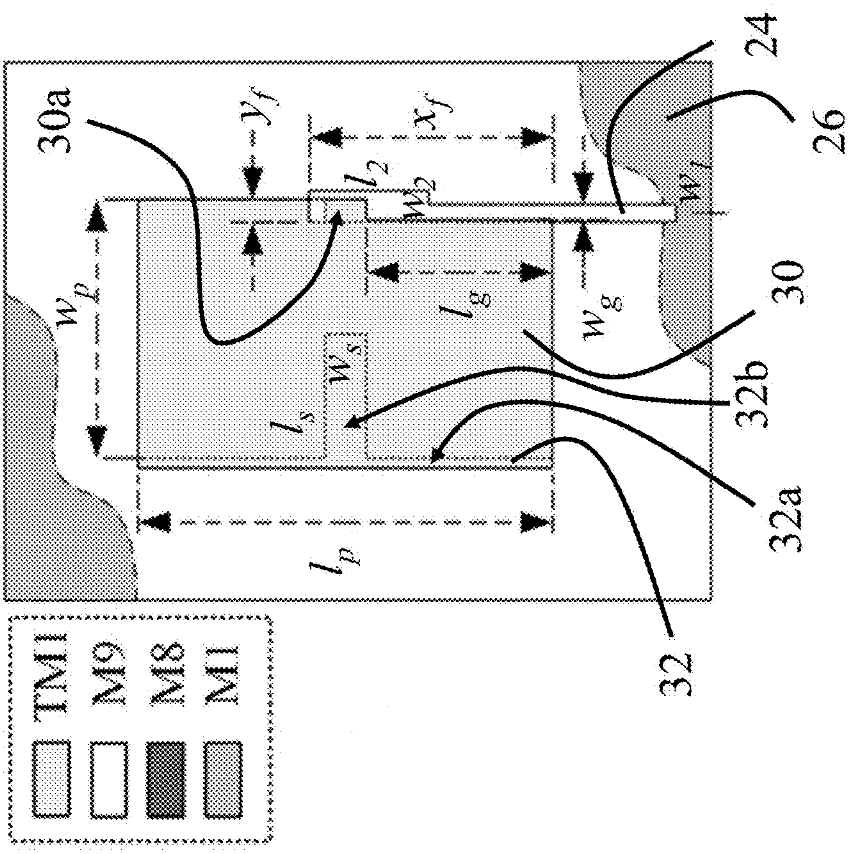
FIG. 3*b* is a top view of the radiating element in FIG. 3*a*, showing dimensions of the radiating element.
Figure 3A:
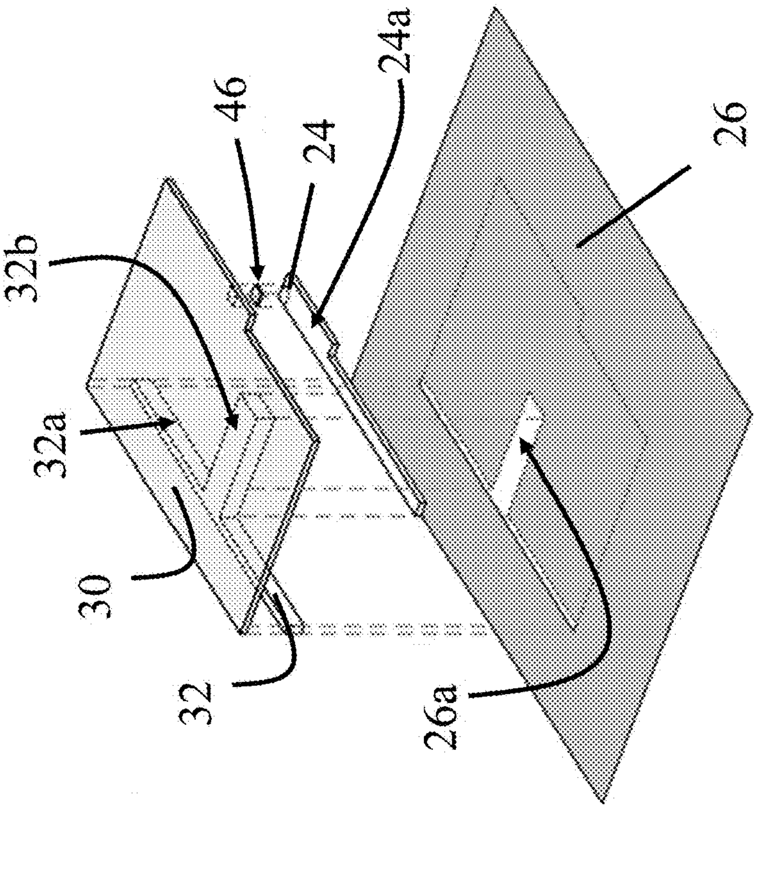
FIG. 3*a* is an exploded view of one of the radiating elements in the antenna of FIGS. 1-2.

Turning now to FIGS. 3*a*-3*b*, the structure of each of the radiating elements 20*a*, 20*b*, 20*c*, 20*d* will now be described. As mentioned above these radiating elements 20*a*, 20*b*, 20*c*, 20*d* share similar internal structures, so the structures shown in FIGS. 3*a*-3*b* apply to all of radiating elements 20*a*, 20*b*, 20*c*, 20*d*. The radiating elements 20*a*, 20*b*, 20*c*, 20*d* in this embodiment are designed using a standard 65-nm CMOS process consisting of the ten metal layers mentioned above, ranging from the bottommost metal layer M1 to the topmost layer TM1. In each radiating element, there is a patch element 30 and a T-shaped shorting wall 32. The projection of the shorting wall 32 on the patch element 30 has a substantially "T" shape. The patch element 30 is used as the radiating element's main body, and is designed in TM1 to achieve the highest profile. The patch element 30 has a substantially rectangular shape, and is side-shorted. At a corner of the rectangular shape (which is the corner closet to the feed network), there is a rectangular notch 34 formed, so the patch element 30 is in an incomplete rectangular shape.

A corresponding output arm 24 of the feed network is coupled to the patch element 30 near the rectangular notch 34. The rectangular notch 34 primarily works with the output arm 24 and provides more design freedom, achieving suitable coupling and better impedance matching between the output arm 24 and the patch element 30. The patch element 30 is at the TM1 layer, while the output arm 24 is at the M9 layer which is directly underneath the TM1 layer. As such, an enlarged portion 24*a* of the output arm 24 partially overlaps with a portion 30*a* (see FIG. 3*b*) of the patch element 30 in a top view, and a metallic via 46 is configured at the portion 30*a* to electrically connect the output arm 24 to the patch element 30, as best illustrated in FIG. 3*a*. This feeding design is for better excitation of two different modes, and the output arm 24 having segments with different widths is for better impedance matching.

The rectangular notch 34 (and thus the output arm 24) is located on a first side of the rectangular shape of the patch element 30. The T-shaped shorting wall 32 in comparison is configured substantially at a second side opposite to the first side, and in particular a first segment 32*a* that is aligned with an edge of the patch element 30 at the second side opposite to the rectangular notch 34. The first segment 32*a* has the same length as the second side of the patch element 30 as can be seen in FIG. 3*b*. There is a second segment 32*b* of the shorting wall 32 that extends from the first segment 32*a* at approximately a middle point thereof, and the second segment 32*b* is perpendicular to the first segment 32*a*. The second segment 32*b* extends from the second side of the patch element 30 to a center of the patch element 30. As shown in FIGS. 3*a*-3*b*, the output arm 24 and the first segment 32*a* are parallel to each other.

The shorting wall 32 is constructed with ten metal layers from M1 to TM1 and vias (not shown) stacked between them. As such, the shorting wall 32 shorts the patch element 30 at a side thereof to ground. The construction of the shorting wall 32 resembles the side wall of on-chip substrate-integrated-waveguide (SIW) structures. Given the extremely small side lengths and narrow spacing in the CMOS process, the energy leakage from the gaps between adjacent vias is minimal. Since the shorting wall 32 has a part in the M1 layer, the corresponding portion of the ground layer 26 as shown in FIG. 3*a* is formed with an aperture 26*a* that matches the "T" shape of the shorting wall 32, so that the part of the shorting wall 32 at the M1 layer is received in the aperture 26*a*.

FIG. 3*b* shows the radiating element with dimensions. For the 425-GHz wideband on-chip CP antenna, the optimized parameters of the radiating element are as follows: $w_p$=125 μm, $l_p$=200 μm, $w_s$=20 μm, $l_s$=60 μm, $w_g$=10 μm, $l_g$=90 μm, $x_f$=118 μm, $y_f$=11 μm, $w_1$=8 μm, $w_2$=15 μm, and $l_2$=58 μm.

Figure 4A:
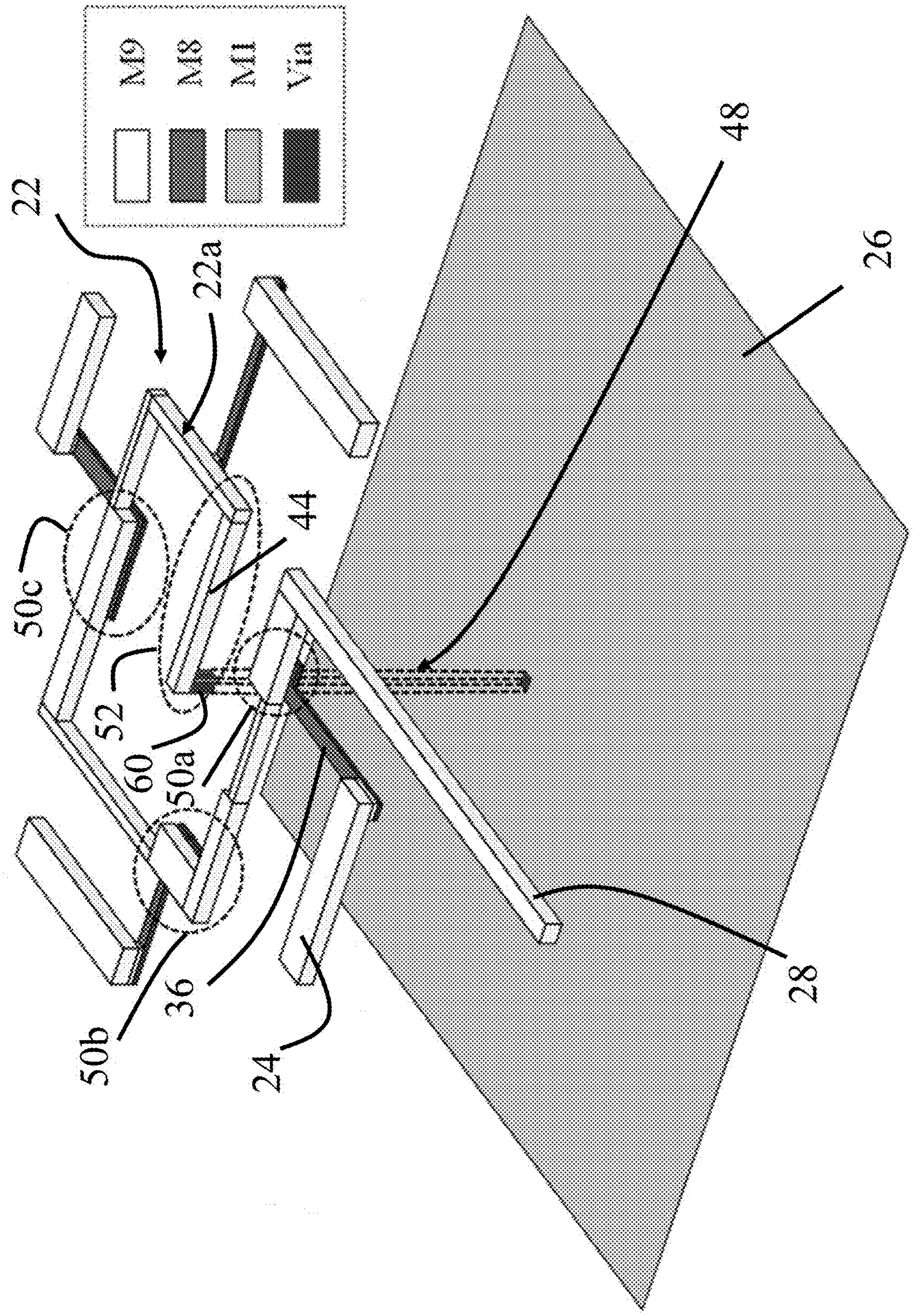
FIG. 4*a* is an exploded view of the feed network in the antenna of FIGS. 1-2.
Figure 4B:
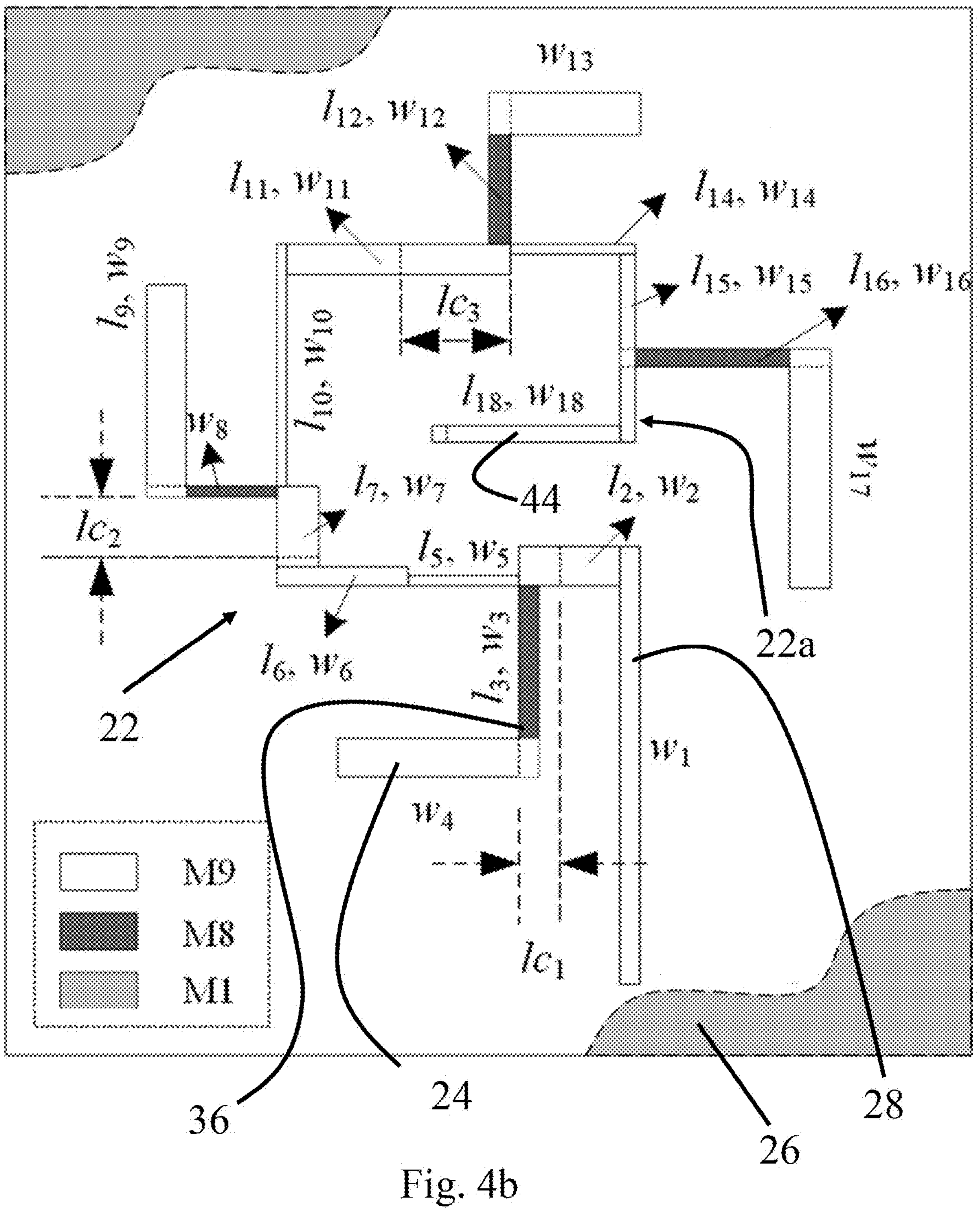
FIG. 4*b* is a top view of the feed network in FIG. 4*a*, showing dimensions of the feed network.

Turning to FIGS. 4*a*-4*b*, the structure of the feed network in the antenna of FIGS. 1-2 will now be described. Conventional sequential-phase feed networks predominantly rely on the physical length of the delay line to accomplish phase progression. For instance, a quarter-wavelength delay line is required to achieve a 90° phase difference. This dependence on physical length substantially increases the size of traditional sequential-phase networks. In contrast, the reactance-loaded sequential-phase feed network in the antenna of FIGS. 1-4*b* uses equivalent capacitors and inductors to achieve phase shifting, resulting in a significant size reduction. This approach paves the way for the design of highly compact and efficient CP antenna systems.

As shown in FIGS. 4*a*-4*b*, in the feed network there are three metal layers used, which includes the ground layer 26 (which is shown as the layer M1), the layer M9 for the majority of components in the feed network, and the layer M8 for connecting lines 36. Meanwhile, two types of vias are employed, including metal vias connecting the M8 and M9 layers (M8-M9, not shown) and a shorting via 60 shorting the end stub 44 to the ground layer 26 (M1-M9) at a center of the feed network (and thus the center of the antenna). There is a shorting line 48 inside the shorting via 60 for shorting the core portion 22 and the shorting line 48 extends in a direction perpendicular to the feeding line 28. The M8-M9 vias electrically connect the output arms 24 to their respective connecting lines 36.

As mentioned above, the feed network mainly contains a square-ring structure which is the core portion 22, and the four output arms 24, all constructed using microstrip lines. The core portion 22 integrates multistage microstrips with variable widths to facilitate power distribution and impedance matching. In other words, there are unequal widths of the core portion 22 as it extends along in the square ring shape. As best shown in FIG. 4*b*, there are five different widths of different segments of the core portion 22. The feeding line 28 extends toward the core portion 22 along a first direction (which is the vertical direction in FIG. 4*b*), and couples with the core portion 22 at a right angle. The feeding line 28 is at the same layer as the core portion 22. The geometrical shape of the core portion 22, starting from the feeding line 28 to the end stub 44, can be described: turning 90° left—turning 90° right—turning 90° right—turning 90° right—turning 90° right. The feeding line 28 is parallel to a fourth segment 22*a* of the core portion 22 that forms the side of the square shape to which the fourth output arm 24 is adjacent. The fourth segment 22*a* does not extend along the same length as other sides of the square shape, but forms a right angle with the end stub 44 at about half of a full length of the square shape's side. As such, the square-ring shape of the core portion 22 is not closed, and the end stub 44 is perpendicular to the feeding line 28. In addition, each of the connecting lines 36 is perpendicular to a side of the core portion 22 it is adjacent to, and also perpendicular to its corresponding output arm 24. As shown in FIG. 4*b*, not all the connecting lines 36 have the same width.

In traditional designs, the outputs are directly connected to the ring structure, and the phase difference is accomplished through the delay line within the ring. However, the feed network shown in FIGS. 4*a*-4*b* adopts an approach where the first three output connecting lines 36 along the signal transmission path, which are in the M8 layer, are detached from the core portion 22 in the M9 layer. The connecting lines 36 are physically separated from the core portion 22 by the thin gaps between the M8 and M9 layers. Taking advantage of the inherent thin interlayer separation in the CMOS process, these gaps create parallel-plate capacitors 50*a*, 50*b*, 50*c*. Each of the parallel-plate capacitors 50*a*, 50*b*, 50*c* is located in front of a corresponding one of the output arms 24 along the signal transmission path of the circularly polarized antenna. As shown in FIG. 4*a*, each of the parallel-plate capacitor 50*a*, 50*b*, 50*c* contains a first portion located in a same layer as remaining part of the core portion as well as the output arms 24, and the first portion is actually part of the core portion 22. There is further a second portion parallel to and located below the first portion. Capacitances of the capacitors 50*a*, 50*b*, 50*c* are tuneable by varying the dimensions of the overlapped areas of the first and second portions. In this embodiment, they are mainly regulated by adjusting $l_{c1}$, $l_{c2}$, and $l_{c3}$ length which are shown in FIG. 4*b*. These capacitors critically influence the energy coupled from the ring structure to the outputs, thereby determining the output phases. Uniquely, the last connecting line 36 which adjacent to the fourth segment 22*a* is connected in parallel with the end stub 44, and the end stub 44 is grounded by the via 60 as mentioned above. The last connecting line 36 exploits the principle that an end-shorted transmission line exhibits inductive behaviour when its length is less than a quarter wavelength. Consequently, the last connecting line 36 electrically parallels to an equivalent inductor 52 formed by the end stub 44 and part of the fourth segment 22*a*, the inductance of which is primarily determined by the length of the shorted line ($l_{18}$). With careful design, these reactive components (the parallel-plate capacitors and the equivalent inductor) function as phase shifters and achieve wanted phase differences without using the long delay line. These reactive loads, especially the parallel-plate capacitors 50*a*, 50*b*, 50*c*, ingeniously exploit the multilayer metals in CMOS technology, where the extremely thin distances between different metal layers are typically seen as an obstacle for antenna and transmission line designs. However, here, it becomes an advantage for designing parallel plate capacitors 50*a*, 50*b*, 50*c* because the closer the two metal layers are, the larger the capacitance value of the parallel plate capacitor can be made. In a 65-nm CMOS technology, the gap between layers M8 and M9 is only 0.8 μm. Such proximity makes the design of the capacitors 50*a*, 50*b*, 50*c* relatively straightforward.

FIG. 4*b* shows the feed network with dimensions. For the 425-GHz wideband on-chip CP antenna, the optimized parameters of the feed network are as follows: $w_1$=4 μm, $l_2$=20 μm, $w_2$=8 μm, $l_3$=30 μm, $w_3$=4 μm, $w_4$=8 μm, $l_5$=22 μm, $w_5$=2 μm, $l_6$=26 μm, $w_6$=4 μm, $l_7$=16 μm, $w_7$=8 μm, $l_8$=18 μm, $w_8$=2 μm, $w_9$=8 μm, $l_{10}$=48 μm, $w_{10}$=2 μm, $l_{11}$=44 μm, $w_{11}$=6 μm, $l_{12}$=22 μm, $w_{12}$=4 μm, $w_{13}$=8 μm, $l_{14}$=25 μm, $w_{14}$=2 μm, $l_{15}$=24 μm, $w_{15}$=3 μm, $l_{16}$=31 μm, $w_{16}$=3 μm, $w_{17}$=8 μm, $l_{18}$=52.5 μm, $w_{18}$=3 μm, $l_{c1}$=8.5 μm, $l_{c2}$=16.5 μm, and $l_{c3}$=21.5 μm.

Figure 5A:
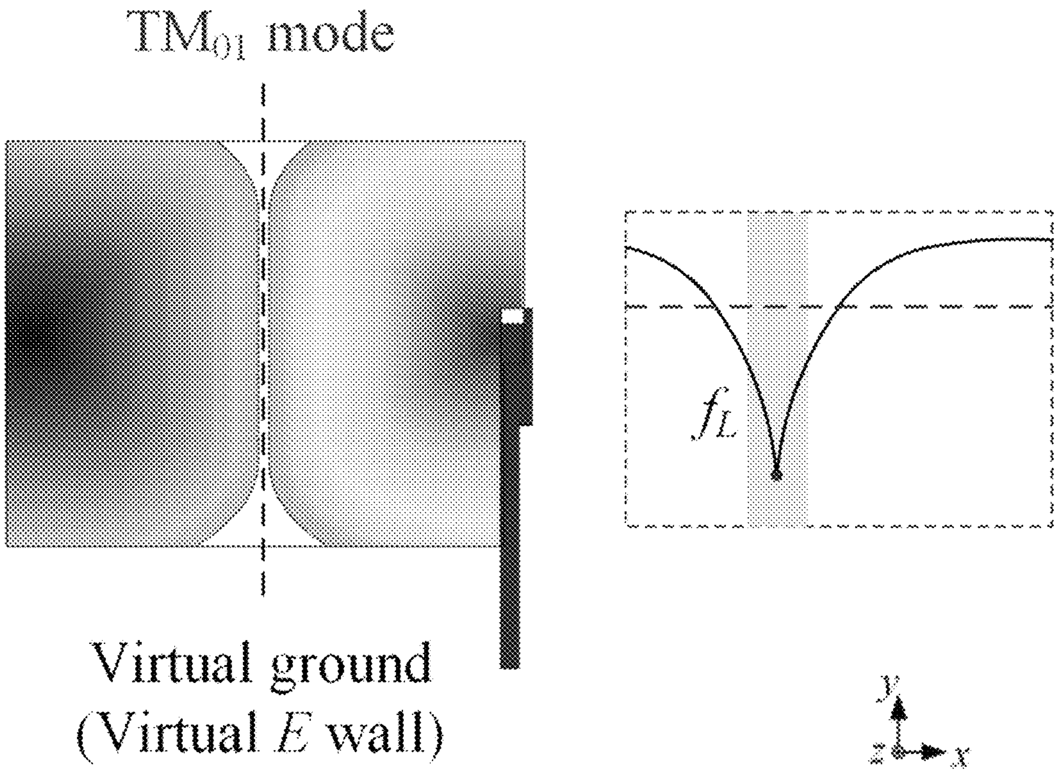
FIG. 5*a* shows the heat map of a patch antenna resonating in complete $TM_{01}$ mode.
Figure 5B:
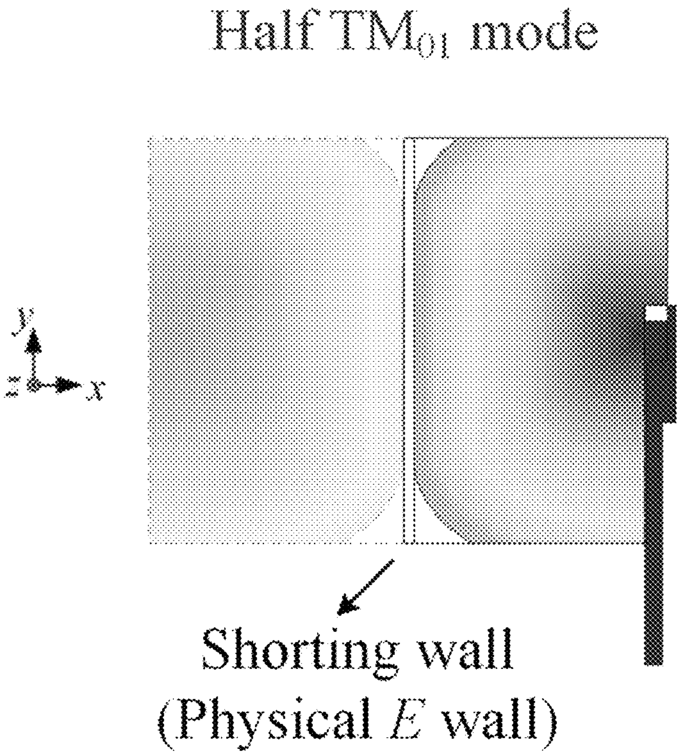
FIG. 5*b* shows the heat map of a patch antenna resonating in half $TM_{01}$ mode.
Figure 5C:
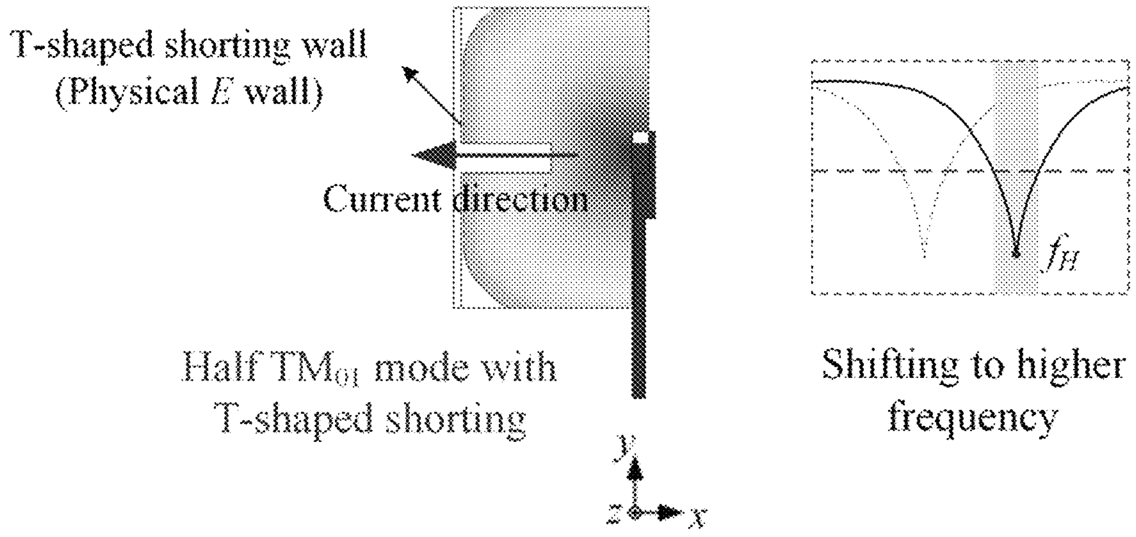
FIG. 5*c* shows the heat map of a radiating element in the antenna of FIGS. 1-4*b* which resonates in half $TM_{01}$ mode.

Having described the physical structure of the antenna in FIGS. 1-4*b*, the description will now go to the model analysis, design process and working principle of the antenna. The radiating elements 20*a*, 20*b*, 20*c*, 20*d* resonate in two distinct modes: the half $TM_{01}$ mode at lower frequency and the quarter $TE_{201}$ mode at higher frequency. Neither of these modes is complete; instead, they exhibit half or a quarter of the size of the full mode. Such unique characteristics primarily stem from the implementation of equivalent electric and magnetic walls. FIGS. 5a-5c demonstrate the design process of the first mode of the radiating element. FIG. 5a shows a conventional patch antenna with the same feeding structure as that in the antenna of FIGS. 1-4b, but with a patch that is about twice as long in the x-direction. This antenna in FIG. 5a resonates at $TM_{01}$ mode, the most common method to excite a patch antenna for broadside radiation. Due to the inherent characteristic of this mode, the electric potential in the middle of the patch is close to zero, equivalent to a virtual ground. Therefore, if creating a physical shorting wall in the middle of the patch and halving the patch size, as shown in FIG. 5b, the resonant frequency of $TM_{01}$ mode should remain unchanged. At this stage, the antenna resonates at the half $TM_{01}$ mode, which is frequently used for antenna miniaturization. Based on the shorting wall established in FIG. 5b, an additional shorting wall (which becomes the second segment 32b in FIGS. 3a-3b) is extended from the center of the side wall in FIG. 5c, making the whole structure visually like the alphabet "T" rotated counter-clockwise by 90°, which is the shape of the shorting wall 32 in FIGS. 1, 3a-3b. The primary function of this extra shorting wall is to tune the resonant frequency of half $TM_{01}$ mode toward higher frequencies and approach the second resonant mode, therefore expanding the impedance bandwidth. The choice to adopt the extra shorting wall over altering the patch size to control the half $TM_{01}$ mode is because changing the patch dimensions would impact both resonances. However, this additional shorting wall can independently control the first resonant mode, i.e., the half $TM_{01}$ mode. The subsequent part of the description about simulation will further discuss more details about the resonance control. It is worth noting that, in the half $TM_{01}$ mode, most of the energy is fed to the radiation elements through their ends connecting via the connecting lines 36, as they are strategically positioned at the energy peak points.

Figure 6A:
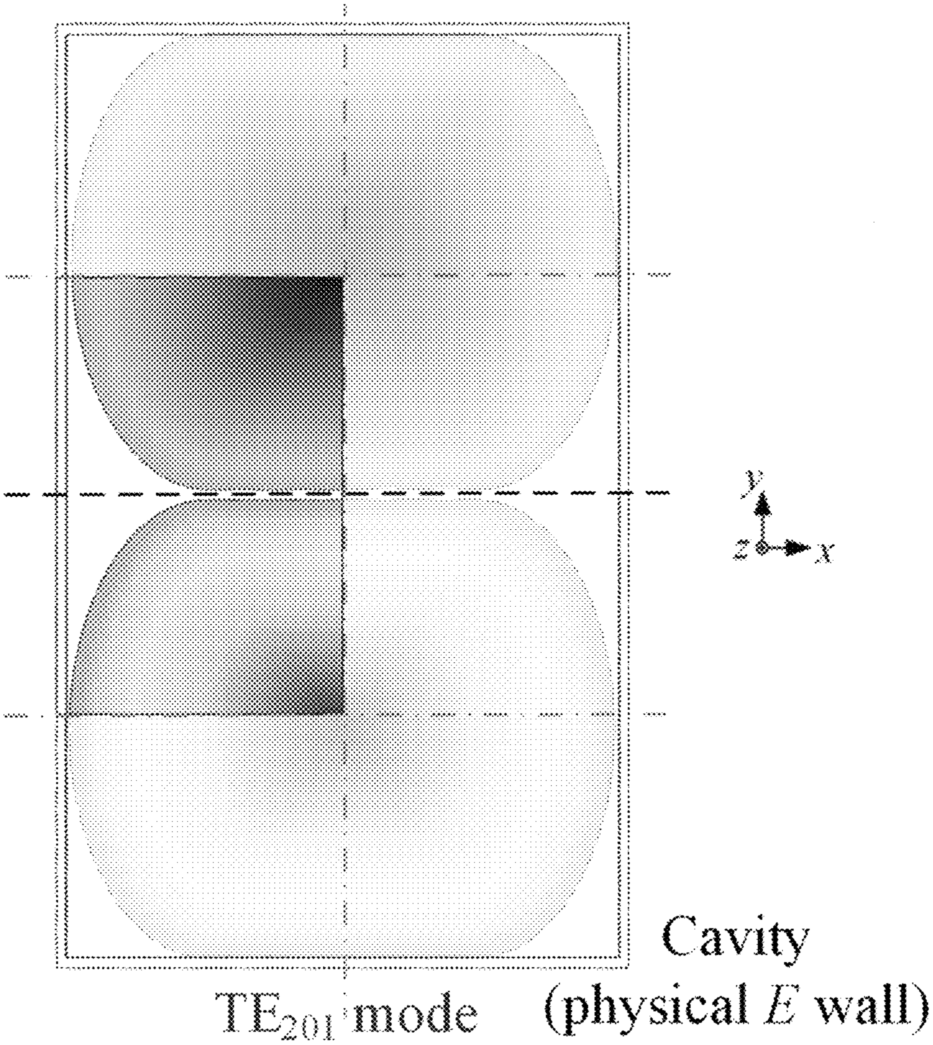
FIG. 6*a* shows the heat map of a cavity resonating in complete $TE_{201}$ mode.
Figure 6B:
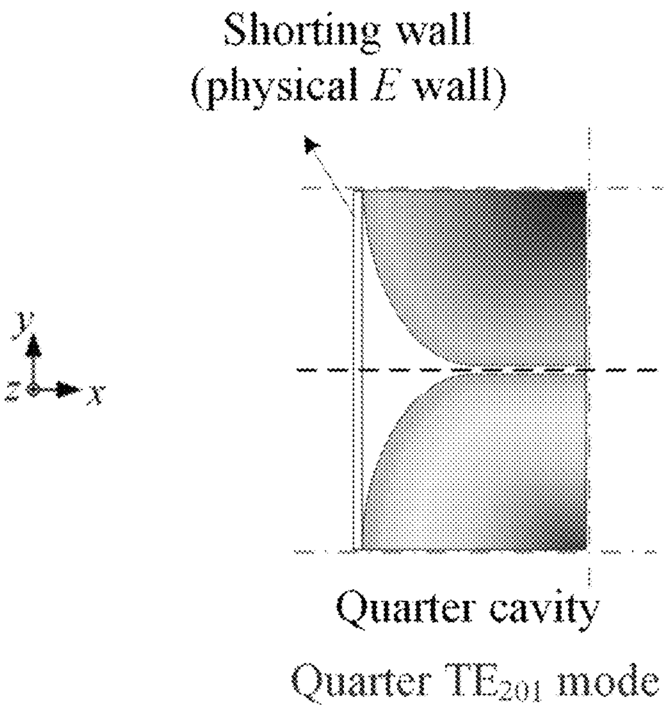
FIG. 6*b* shows the heat map of a quarter cavity resonating in quarter $TE_{201}$ mode.
Figure 6C:
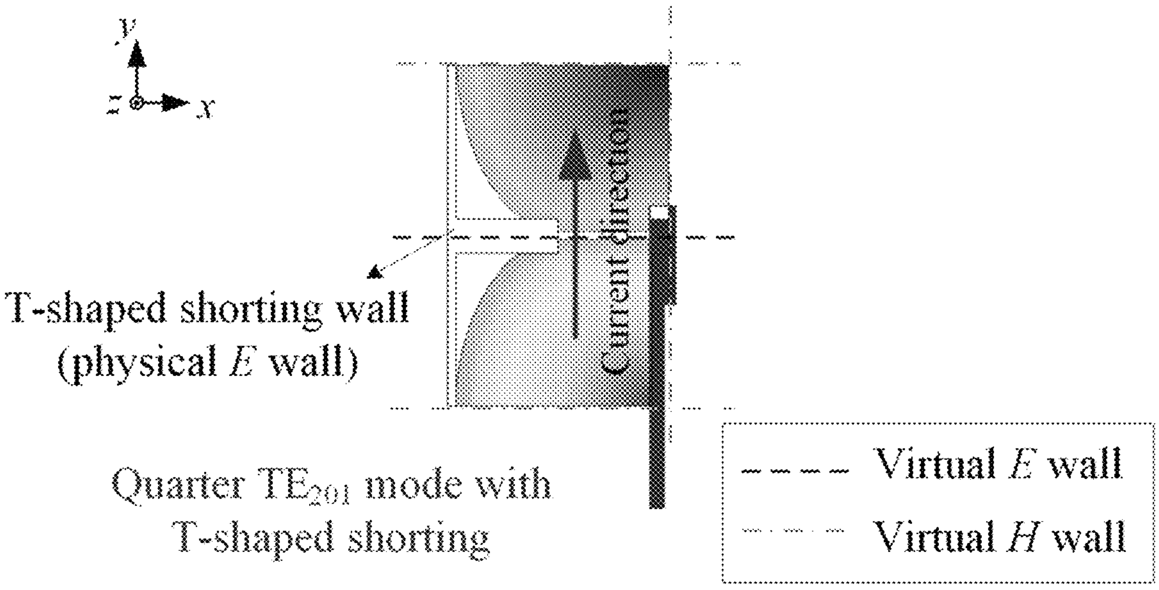
FIG. 6*c* shows the radiating element in the antenna of FIGS. 1-4*b* which resonates in quarter $TE_{201}$ mode.

The design process of the second mode is detailed in FIGS. 6a-6c. FIG. 6a illustrates a fully enclosed metallic cavity that resonates in complete $TE_{201}$ mode. According to the inherent electromagnetic distributions of this mode, the positions of the virtual electric (E) wall and the virtual magnetic (H) wall are readily discerned, as shown by the dashed lines within FIG. 6a. A quarter section of this full metallic cavity is extracted to create the quarter cavity shown in FIG. 6b. This quarter cavity retains the original physical E wall on its left side but with the other three sides open. The metal-air interface of these three open sides can be equivalently regarded as the magnetic walls, leaving the resonant mode within the quarter cavity unaltered, given the consistent boundary conditions. The quarter cavity resonates in the unique quarter $TE_{201}$ mode at this stage. The utilization of the H wall in this design process is much like the application of half-SIW (HSIW) principles in miniaturizing waveguide structures. After adding the T-shaped shorting wall and feeding structure, the quarter cavity evolves to the radiating element in FIG. 6c, which is the radiating element shown in FIG. 3a. It can be observed that the central shorting wall (which correspond to the second segment 32b) is precisely at the zero-electric-potential position of the quarter $TE_{201}$ mode, hence causing minimal influence on the resonant frequency of this mode. Therefore, by manipulating the extension length of the central shorting wall, the resonant frequency of the half $TM_{01}$ mode can be individually adjusted while the quarter $TE_{201}$ mode is unaffected.

The equivalent E and H walls are utilized in the radiating element design to create a compact structure that can resonate in two incomplete modes. Using these two modes expands the impedance bandwidth while maintaining a compact size is greatly beneficial for cost control and further integration with the sequential-phase feed network.

Figure 7A:
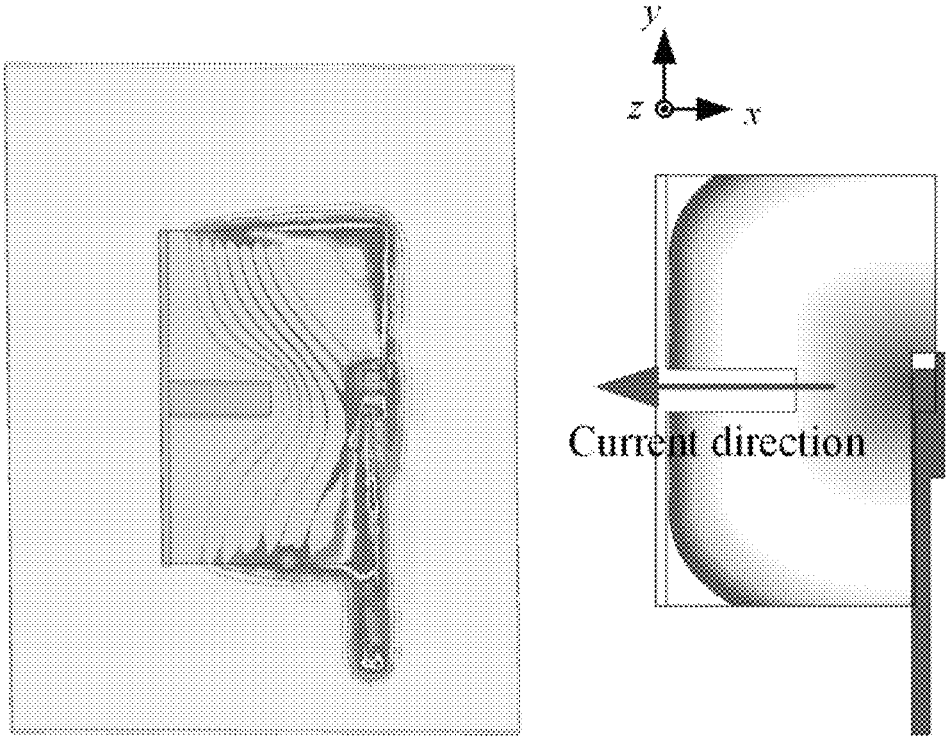
FIG. 7*a* shows time-averaged E-field magnitude distributions of a radiating element of the antenna of FIGS. 1-4*b* on the xoy cross-section when f=390 GHz.
Figure 7B:
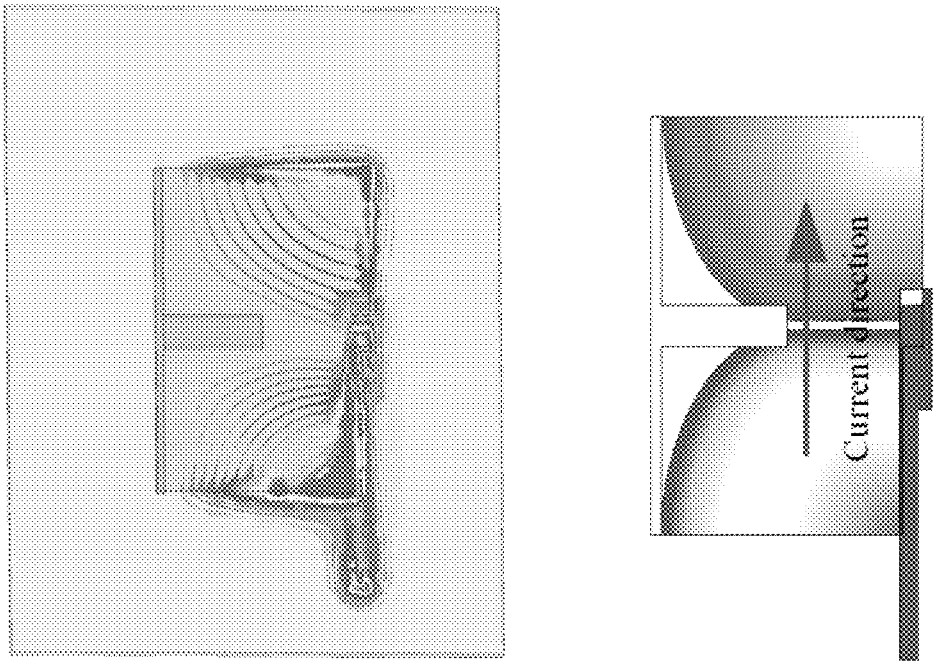
FIG. 7*b* shows time-averaged E-field magnitude distributions of the radiating element on the xoy cross-section when f=440 GHz.
Figure 8:
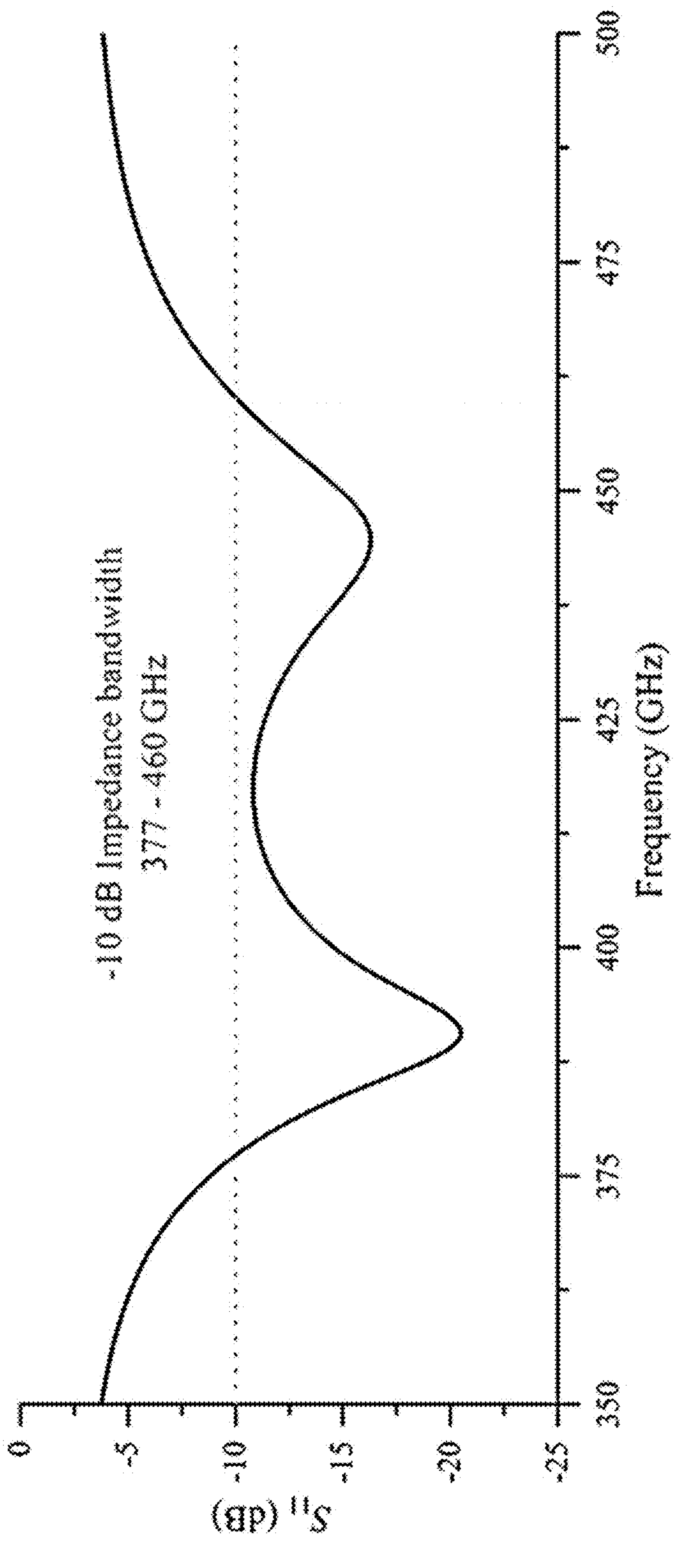
FIG. 8 shows a simulated reflection coefficient of the radiating element.

The radiating element design for the radiating elements 20a, 20b, 20c, 20d is simulated by using commercial software HFSS. The overall size of the element is no larger than 150 μm×250 μm, equivalent to $0.21\lambda_0 \times 0.35\lambda_0$ at 425 GHz. As depicted in FIG. 8, simulations predict that −10 dB reflection coefficient spans from 377 to 460 GHz. With the distance from M1 to TM1 being 8.8 μm, this element exhibits an extremely low profile of $0.012\lambda_0$. Two distinct resonances at 390 GHz and 440 GHz are seen from the $|S_{11}|$ curve. The time-averaged E-field magnitude distributions of the element on the xoy cross-section at 390 GHz and 440 GHz are respectively depicted in FIGS. 7a-7b. As expected, the antenna works in half $TM_{10}$ mode at a lower frequency, as shown in FIG. 7a, and quarter $TE_{201}$ mode at a higher frequency, as shown in FIG. 7b, which agrees with the theoretical analysis set out above.

Figure 9A:
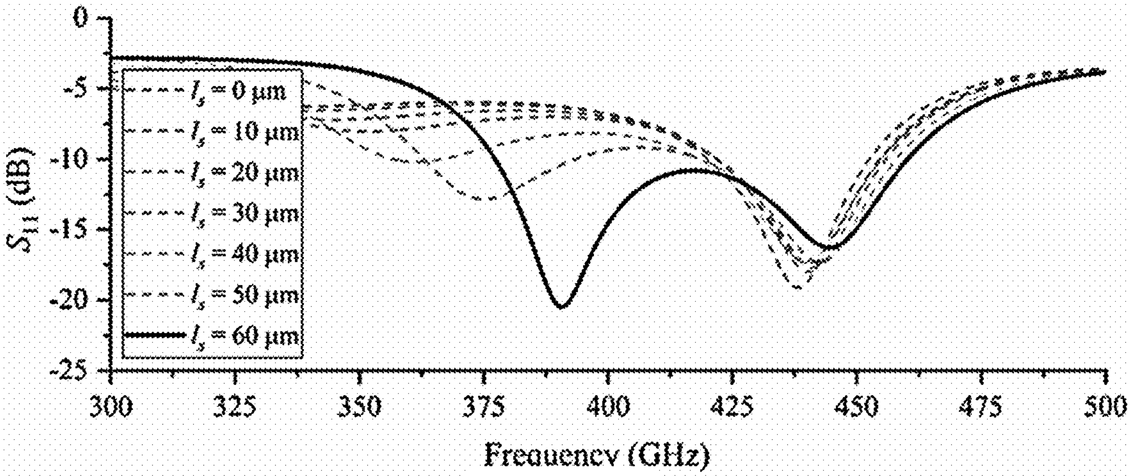
FIG. 9*a* shows simulated reflection coefficients with different sizes of $l_s$ from $l_s$=0 μm to 60 μm (Reference value: $l_s$=60 μm).

For a demonstration of resonance control, several critical parameters of the radiating element were swept, with results shown and discussed. The length of the central shorting wall ($l_s$) was initially swept from 0 μm to 60 μm in increments of 10 μm. The results are shown in FIG. 9a. It is seen that $l_s$ significantly impacts the first resonance while the second resonance shows only a slight deviation. The longer the $l_s$, the higher the first resonant frequency. This is because half $TM_{01}$ mode is directly related to the patch length in the x-direction, the change of which will lead to a corresponding shift of the resonant frequency. Although the length of the central shorting wall $l_s$ does not physically change the patch length, it shortens the surface current path by moving the position of the virtual ground in half $TM_{01}$ mode. Meanwhile, this central shorting wall is located in the zero electric potential of quarter $TE_{201}$ mode, hence causing minimal influence on the resonant frequency of this mode. Therefore, individual manipulation of the first resonance can be realized by changing $l_s$, while the quarter $TE_{201}$ mode is almost unaffected.

Figure 9B:
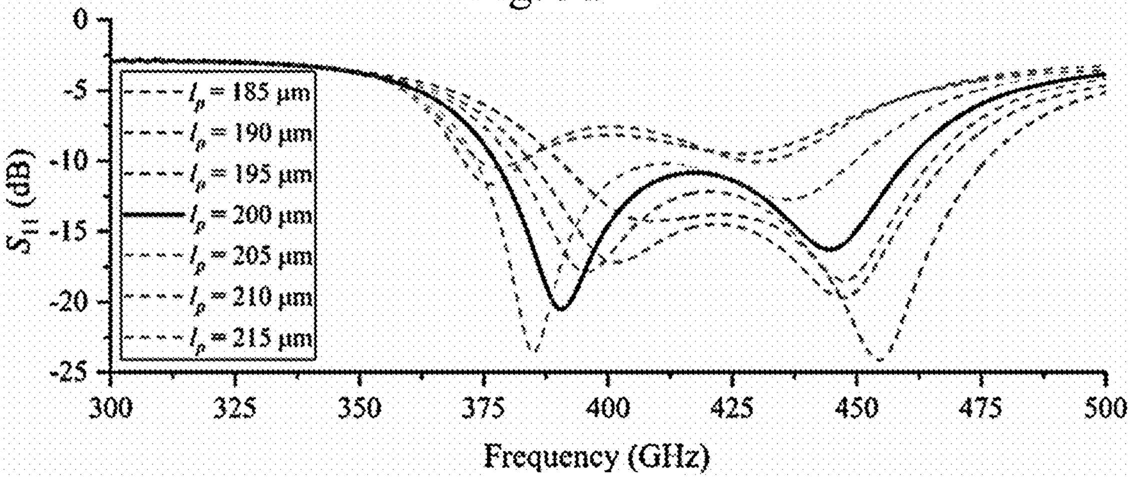
FIG. 9*b* shows simulated reflection coefficients with different sizes o $l_p$ from $l_p$=185 μm to 215 μm (Reference value: $l_p$=200 μm).

Subsequently, the patch length in the y-direction ($l_p$) was swept from 190 μm to 210 μm in increments of 5 μm, and the results are shown in FIG. 9b. As observed, the change in patch length $l_p$ influences both the first and second resonances, manifesting as a decrease in the frequency of both resonant points with an increase in $l_p$. Given that the $TE_{201}$ mode is related to both the length and width of the cavity, a larger cavity size corresponds to a lower resonant frequency. For the first resonance, theoretically, this mode should only be related to the patch width $w_p$. However, due to the unique feeding mechanism taken in this design, the change in patch length $l_p$ also affects the first resonant point.

Figure 9C:
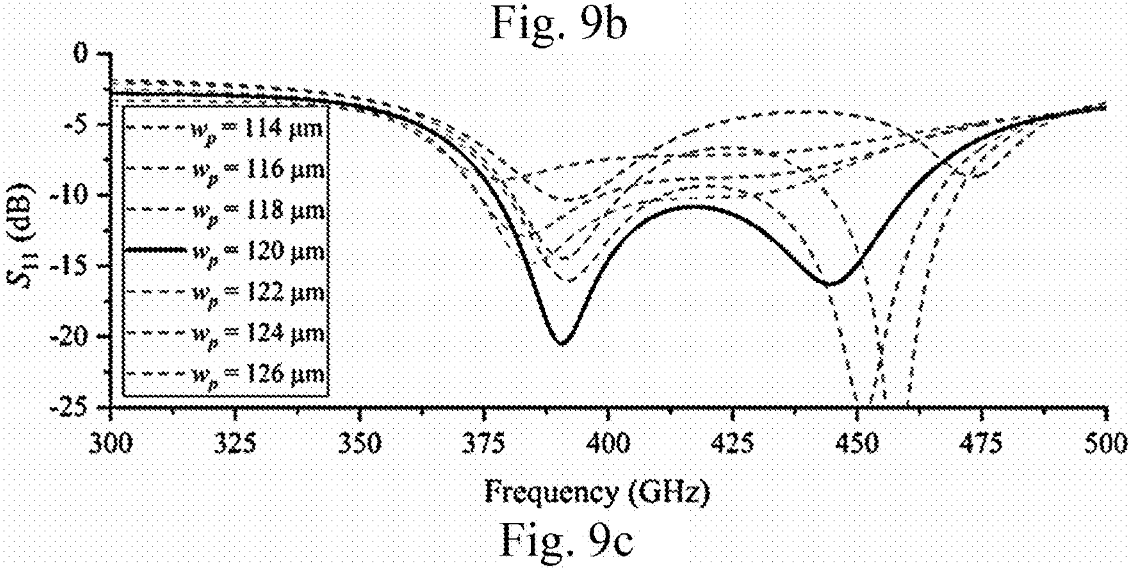
FIG. 9*c* shows simulated reflection coefficients with different sizes of $w_p$ from $w_p$=114 μm to 126 μm (Reference value: $w_p$=120 μm).

Lastly, the influence of the patch width ($w_p$) on the reflection coefficients was also studied. The parametric sweep results are displayed in FIG. 9c. It can be observed that the width of the patch also influences both resonances. An increase in patch width correlates with a decrease in both resonant frequencies, a relationship that can be well understood given the dependence of the $TM_{01}$ and $TE_{201}$ modes on the patch width. From the above parameter sweep analysis, it is evident that the patch's length and width impact both two resonant frequencies. Thus, bandwidth adjustment can be realized by changing the length of the central shorting wall. The impedance bandwidth can be expanded by bringing the first resonance closer to the second one.

Since the radiating element has multiple polarization directions, it cannot be used independently to achieve LP or CP radiation. However, applying a sequential-phase feed can lead to transforming the final radiation into CP, regardless of the inherent polarizations of the radiating element.

Next, the working principle of the sequential-phase feed network in FIGS. 1, 4*a*-4*b* will be discussed. In the design of CP antennas, the sequential-phase feed network serves two primary functions: ensuring equal power distribution and achieving a fixed phase difference between adjacent outputs. From the perspective of power distribution, the feed network in FIGS. 1, 4*a*-4*b* can be viewed as three power dividers and one through line. For the purpose of easy reference, the four output arms 24 in FIGS. 1, 4*a*-4*b* are labelled respectively as Output 1-4 in FIGS. 10*a*-10*b*, where the first output arm 24 along the signal transmission path is labelled as Output 1, and so on. The part of Output 1 operates as a 1:3 power divider: a quarter of the feed energy couples to Output 1 via Capacitor 1 (which is the parallel-plate capacitor 50*a* in FIG. 4*a*), and the remaining energy traverses to the subsequent stage. Similarly, the part of Output 2 functions as a 1:2 power divider. The power distribution ratio in the second part is 1:2, higher than the 1:3 ratio of the preceding stage. Therefore, a larger coupling factor, hence larger capacitance, is required. Thus, the length of Capacitor 2 ($l_{c2}$, which is the parallel-plate capacitor 50*b* in FIG. 4*a*) is longer than that of Capacitor 1 ($l_{c1}$). Following a similar principle, the part of Output 3 acts as a 1:1 power divider, and a higher coupling factor of Capacitor 3 (which is the parallel-plate capacitor 50*c* in FIG. 4*a*) is required. As such, Capacitor 3 is designed with the highest capacitance, therefore longer than the previous two capacitors. Output 4 is directly connected to the square ring and is paralleled with an equivalent Inductor 1 (which is the inductor 52 in FIG. 4*a*), realized through an end-shorted transmission line. It is different from previous ones because it does not require power distribution. All energy should be directed into Output 4, therefore necessitating a high coupling factor. Achieving this with a capacitor is significantly challenging. Consequently, the last output incorporates an equivalent inductor to shift the phase.

Figure 10A:
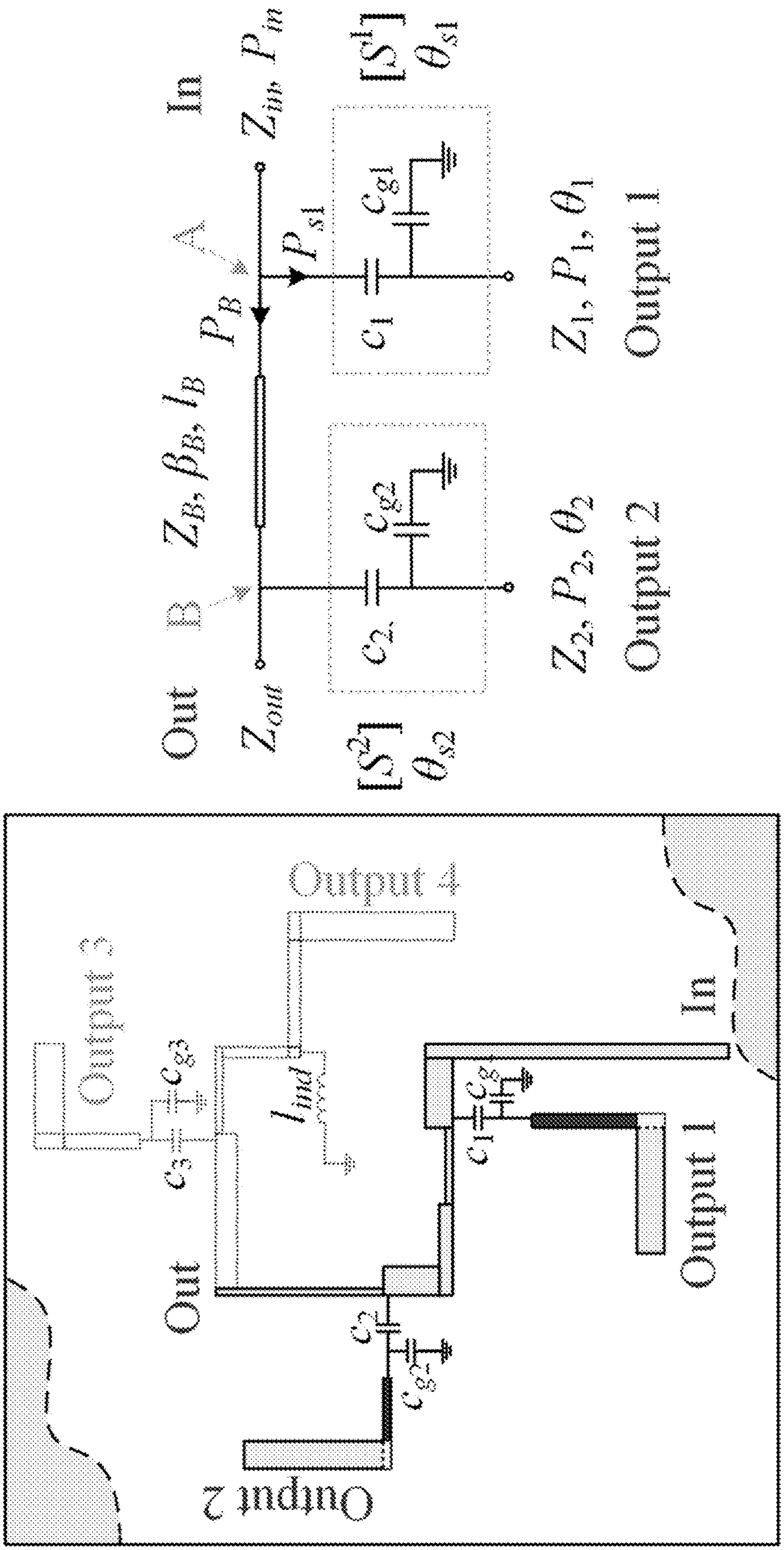
FIG. 10*a* shows a simplified equivalent circuit for Outputs 1 and 2 of the feed network in FIGS. 4*a*-4*b*.

In order to quantitatively understand how these reactive loads change the amplitude and phase, a simplified circuit model of Outputs 1 and 2 is first given in FIG. 10*a*. In this model, all resistive losses are discarded. Outputs 1 and 2 are connected to the square ring structure via series capacitors $c_1$ and $c_2$, respectively. Given the open-ended nature of the microstrip arms, they are also paralleled with parasitic capacitors $c_{g1}$ and $c_{g2}$. The subsequent transmission lines and radiating elements following Outputs 1 and 2 are simplified as loads with impedances $Z_1$ and $Z_2$ with phase $\theta_1$ and $\theta_2$, respectively. The multistage microstrip line between Outputs 1 and 2 is simplified as a transmission line with a characteristic impedance $Z_B$, a phase constant $\beta_B$, and length $l_B$. The S matrix for the capacitor network of Output 1 and 2 (enclosed in the grey dotted line box) is $[S^1]$ and $[S^2]$, whose phase delays are $\theta_{s1}$ and $\theta_{s2}$, respectively. As previously mentioned, point A can be viewed as a power divider with a ratio of 1:3. Assuming the subsequent circuit is well matched, the impedance seen from point A looking into the subsequent transmission line is approximately $Z_B$, while the impedance looking into Output 1 can be described by the following equation.

$$Z_{s1} = \frac{1}{\frac{1}{Z_1} + j\omega c_{g1}} + \frac{1}{j\omega c_1} \tag{1}$$

Given that the value of $C_{g1}$ is quite small, the power at Output $1P_1$ can be approximated to $P_{s1}$.

$$\begin{aligned} P_1 \approx P_{s1} &= \frac{Z_B}{Z_B + Z_{s1}} \cdot P_{in} \\ &= \frac{Z_B}{Z_B + \frac{1}{\frac{1}{Z_1} + j\omega c_{g1}} + \frac{1}{j\omega c_1}} \cdot P_{in} \end{aligned} \tag{2}$$

As indicated by (2), the energy at Output 1 is directly proportional to both the capacitors $c_1$ and $c_{g1}$. While $c_{g1}$ represents the inherent parasitic capacitance of the open-circuited microstrip line, it is challenging to adjust. However, the value of $c_1$ can be manipulated by altering $l_{c1}$, providing a method to manipulate the power distribution ratio at point A. Following the same principle, the power distribution ratio for the subsequent Outputs 2 and 3 can also be controlled by adjusting the length $l_{c2}$ and $l_{c3}$.

Regarding the phase shift, the $S_{21}$ for the capacitor network of Output1 and its resultant phase change $\theta_{s1}$ can be derived as follows:

$$\begin{cases} S_{21}^1 = \dfrac{2}{2 + \frac{c_{g1}}{c_1} - j\left(\frac{1}{\omega c_1} - \omega c_{g1}\right)} \\ \theta_{s1} = \arctan\left(\dfrac{\frac{1}{\omega c_1} - \omega c_{g1}}{2 + \frac{c_{g1}}{c_1}}\right) \end{cases} \tag{3}$$

Similarly, the $S_{21}$ for the capacitor network of Output 2 and its resultant phase change $\theta_{s1}$ can be represented as follows:

$$\begin{cases} S_{21}^2 = \dfrac{2}{2 + \frac{c_{g2}}{c_2} - j\left(\frac{1}{\omega c_2} - \omega c_{g2}\right)} \\ \theta_{s2} = \arctan\left(\dfrac{\frac{1}{\omega c_2} - \omega c_{g2}}{2 + \frac{c_{g2}}{c_2}}\right) \end{cases} \tag{4}$$

Therefore, the phase difference between Outputs 1 and 2 ($\theta_{12}$) can be expressed as follows:

$$\begin{aligned} \theta_{12} &= \theta_1 - \theta_2 = \theta_{s1} - (\theta_{s2} - \beta_B l_B) \\ &= \arctan\left(\frac{\frac{1}{\omega c_1} - \omega c_{g1}}{2 + \frac{c_{g1}}{c_1}}\right) - \arctan\left(\frac{\frac{1}{\omega c_2} - \omega c_{g2}}{2 + \frac{c_{g2}}{c_2}}\right) + \beta_B l_B \end{aligned} \tag{5}$$

Considering that the values of $c_{g1}$ and $c_{g2}$ are relatively small and their impact can be ignored, (5) can be rewritten as follows:

$$\theta_{12} \approx \arctan\left(\frac{1}{2\omega c_1}\right) - \arctan\left(\frac{1}{2\omega c_2}\right) + \beta_B l_B \tag{6}$$

The equation above demonstrates how the phase difference between Outputs 1 and 2 relates to capacitors $c_1$ and $c_2$, and the length of the transmission line between two outports ($l_B$). Due to the implementation of a similar design, this equation is also applicable to the phase difference between Outputs 2 and 3. In a four-output sequential-phase feed design, the phase between the adjacent outputs must be 90° for the generation of CP waves. It is necessary to ensure the difference of the first two terms in (6) is positive to reduce the length of the transmission line ($l_B$) while maintaining a 90° phase difference. Because "arctan" is a monotonically increasing function, to ensure a positive difference between the first two terms in (6), $c_1$ should be smaller than $c_2$. The greater the difference between these two capacitors, the shorter the transmission line can be realized. Interestingly, this conclusion seamlessly aligns with the power distribution principle mentioned earlier. As discussed before, Outputs 1 and 2 can be regarded as two power dividers with power distribution ratios of 1:3 and 1:2, respectively. According to (2), to achieve such an incremental power distribution ratio, capacitors $c_1$ and $c_2$ values must also be incremental. These increasing capacitor values also ensure a positive difference between the first two terms in (6), contributing to a positive phase shift and reducing the length of the transmission line needed.

Figure 10B:
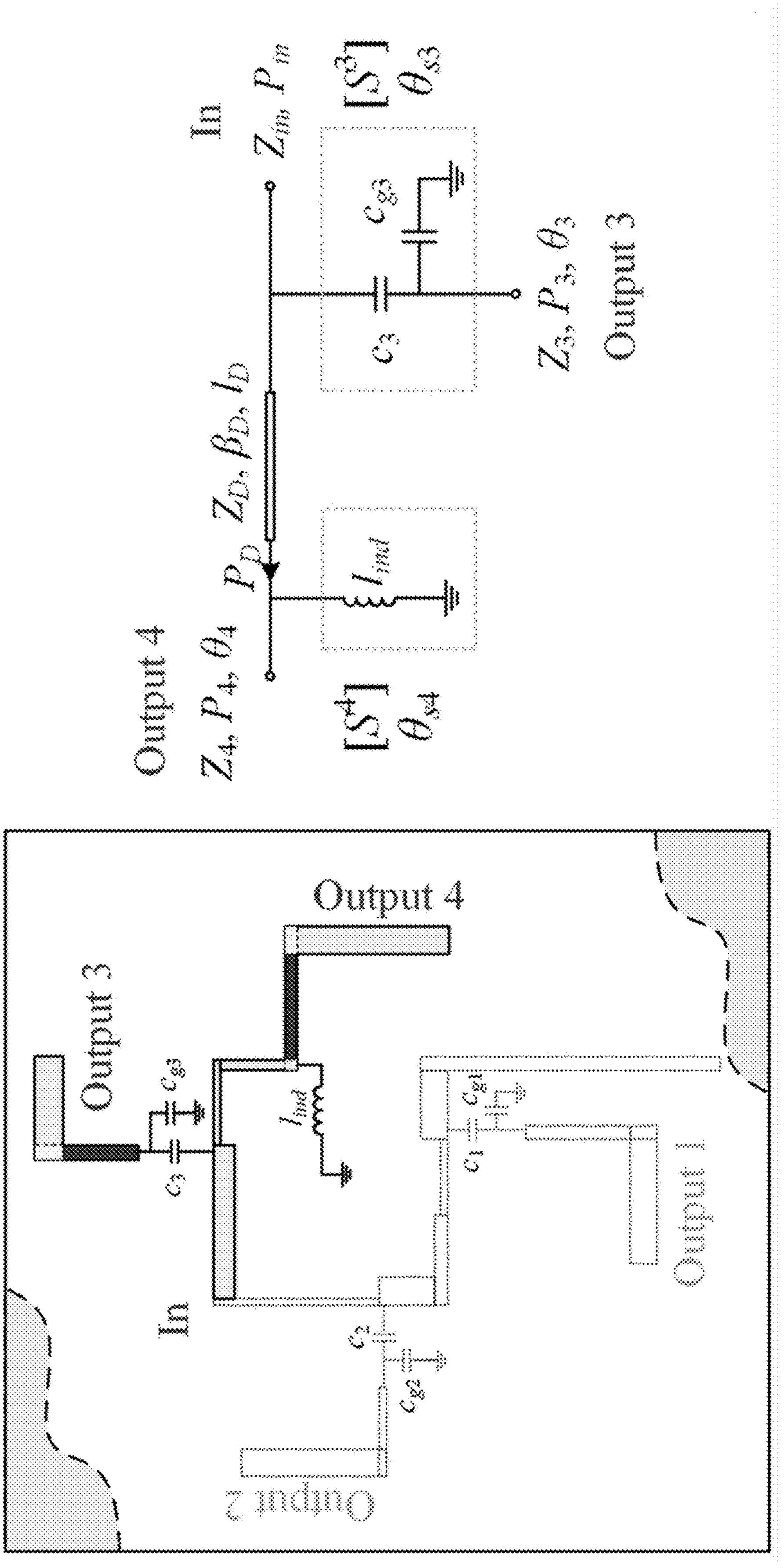
FIG. 10*b* shows a simplified equivalent circuit for Outputs 3 and 4 of the feed network in FIGS. 4*a*-4*b*.

Subsequently, a simplified circuit model of Outputs 3 and 4 is illustrated in FIG. 10*b*. Similarly, all resistive losses are discarded in this model. The transmission lines and radiating elements following Outputs 3 and 4 are simplified as loads with impedances $Z_3$ and $Z_4$ with output phases $\theta_3$ and $\theta_4$, respectively. The multistage microstrip line between Outputs 3 and 4 is simplified as a transmission line with a characteristic impedance $Z_D$, a phase constant $\beta_D$, and length $l_D$. Output 3 is loaded with a series capacitor $c_3$ and a parallel capacitor $c_{g3}$. Output 4 is paralleled with an end-shorted line (impedance $Z_{ind}$, phase constant $\beta_{ind}$, and length $l_{18}$), equivalent to an inductor $l_{ind}$. The S matrices for the reactive networks of Outputs 3 and 4 (enclosed in the grey dotted line box) are $[S^3]$ and $[S^4]$, whose phase delays are $\theta_{s3}$ and $\theta_{s4}$, respectively.

The power distribution principle for Output 3 is similar to that for Output 1 and will not be reiterated here. The power of Output 4 is expressed as follows:

$$P_4 = \frac{1}{\dfrac{Z_4}{j\omega l_{ind}} + 1} \cdot P_D = \frac{1}{\dfrac{Z_4}{jZ_{ind}\tan\beta_{ind}l_{18}} + 1} \cdot P_D \tag{7}$$

Since the final stage requires that all energy is fed into Output 4 rather than being short-circuited to the ground, it is essential for the first term in the denominator of (7) to be as close to zero as possible. This can be achieved by adjusting multiple parameters, including the length of the shorting line $l_{18}$, output impedance $Z_4$, and characteristic impedance of the shorting line $Z_{ind}$. The phase change due to the shorting line $\theta_{s4}$ can be expressed as follows:

$$\theta_{s4} = \arctan\left(-\frac{1}{2\omega l_{ind}}\right) = \arctan\left(-\frac{1}{2Z_{ind}\tan\beta_{ind}l_{18}}\right) \tag{8}$$

Therefore, the phase difference between Output 3 and 4 ($\theta_{34}$) can be expressed as follows:

$$\theta_{34} = \theta_3 - \theta_4 = \theta_{s3} - \theta_{s4} + \beta_D l_D \tag{9}$$

-continued $$= \arctan\left(\frac{\dfrac{1}{\omega c_3} - \omega c_{g3}}{2 + \dfrac{c_{g3}}{c_3}}\right) + \arctan\left(\frac{1}{2Z_{ind}\tan\beta_{ind}l_{18}}\right) + \beta_D l_D$$

By neglecting $c_{g3}$, (9) can be rewritten as follows:

$$\theta_{34} \approx \arctan\left(\frac{1}{2\omega c_3}\right) + \arctan\left(\frac{1}{2Z_{ind}\tan\beta_{ind}l_{18}}\right) + \beta_D l_D \tag{10}$$

Given that the shorting microstrip line ($l_{18}$) length is less than a quarter of a wavelength, all terms in (9) are positive. This indicates that introducing capacitance $c_3$ and equivalent inductance $l_{ind}$ can shorten the transmission line length $l_D$ between Outputs 3 and 4 while maintaining a 90° phase difference. Moreover, $c_3$ and $l_{ind}$ can be manipulated by adjusting the length of the parallel-plate capacitor ($l_{c3}$) and the shorting line ($l_{18}$).

Figure 11A:
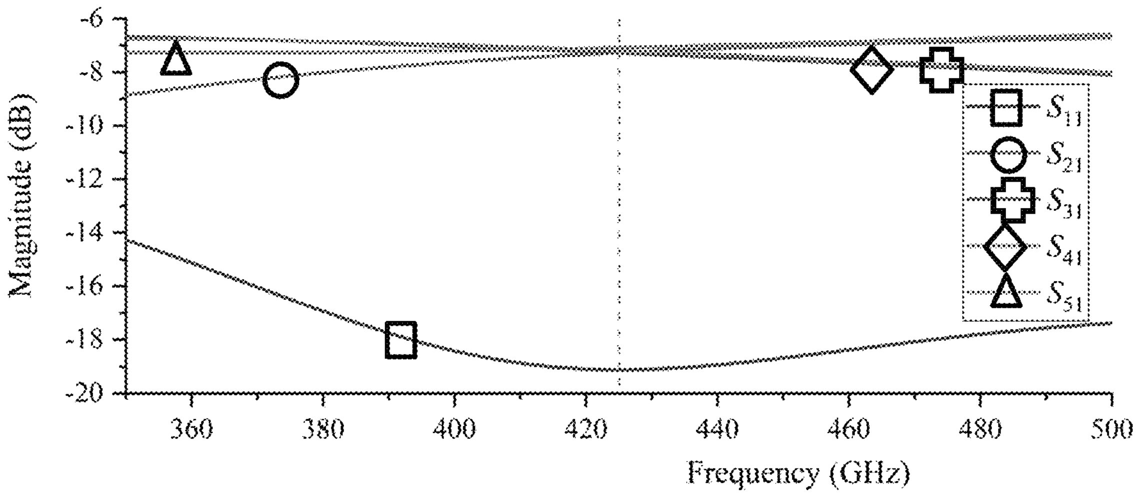
FIG. 11*a* shows simulated output of magnitudes of the feed network.
Figure 11B:
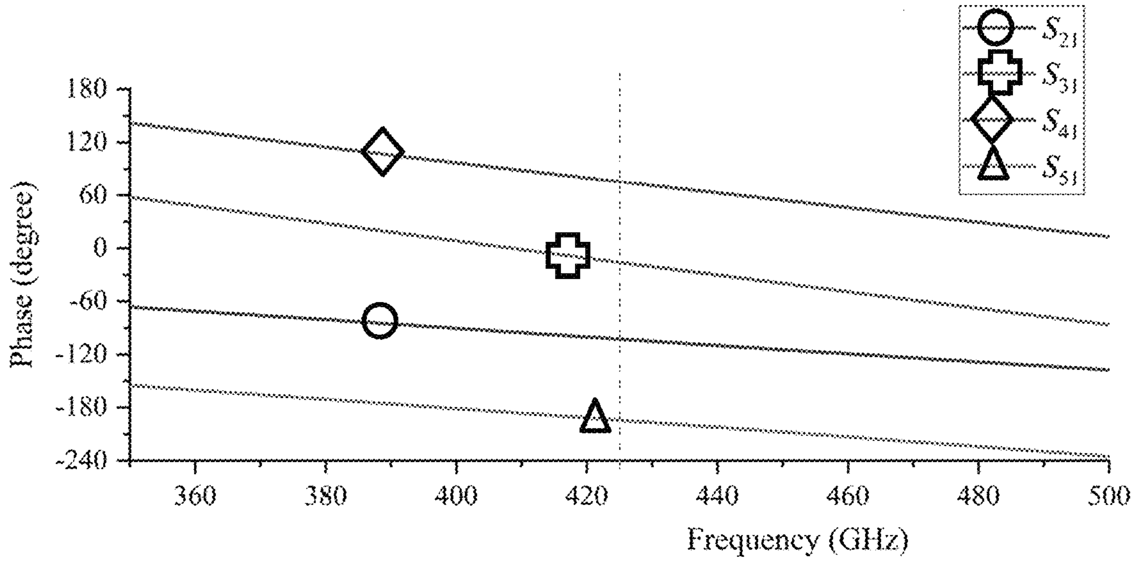
FIG. 11*b* shows simulated output of phases of the feed network.

The feed network in FIGS. 4*a*-4*b* is simulated by using commercial software HFSS. The overall size of the feed network is approximately 140 μm×140 μm, equivalent to $0.2\lambda_0 \times 0.2\lambda_0$ at 425 GHz. The simulated magnitudes of S parameters are shown in FIG. 11*a*. Impedance matching is particularly challenging in this design due to the employment of the reactive components. Nevertheless, the simulated $|S_{11}|$ curve consistently remains below −15 dB, indicating a good impedance matching level. Furthermore, the power levels at the central frequency range from 7.1 dB to 7.3 dB, showcasing a uniform distribution of power across all four ports. The simulated output phases are illustrated in FIG. 11*b*. At a central frequency of 425 GHz, the phase of four output ports is 76, −16, −103, and −195 degrees, respectively. Each pair of adjacent ports maintains a phase difference of approximately 90°. Additionally, these phase curves are nearly parallel to each other, indicating an excellent sequential phase output across a broad frequency range. This feature is critically significant for CP antennas, as maintaining these conditions over a wide frequency range substantially improves the AR bandwidth.

Next, an experimental validation conducted for the antenna shown in FIGS. 1-4*b* will be described. A prototype according to the antenna was fabricated utilizing the 65-nm CMOS process for validation purposes. The complete structure mainly includes four parts: radiating elements, a sequential-phase feed network, GSG pads, and a ground plane. The overall dimensions of the antenna are approximately 390 μm×390 μm, equivalent to $0.55\lambda_0 \times 0.55\lambda_0$ at 425 GHz. Notably, the feed network is small enough to be entirely placed within the gaps between the radiating elements, demonstrating a remarkable degree of miniaturization. This is a significant advantage over traditional sequential-phase feed networks, which typically demand considerable space due to long delay lines. In order to comply with the design rules, many holes were introduced on both M1 and TM1 layers. Owing to their minimal dimensions, these holes exert a limited impact on the antenna's performance. A GSG pad structure is designed in TM1 to interface with a 50Ω GSG probe having a pitch of 50 μm. The central pad(S) is directly connected to the microstrip line, while the two side pads (G) are shorted to the ground. However, the GSG pads are not designed with 50Ω impedance and may introduce unwanted parasitic effects, potentially distorting the S parameters and reducing the gain. A TRL calibration will be performed based on specially designed TRL kits to solve this problem.

The sample was tested using an on-wafer probe station for S-parameter measurement. The measurement setup involves the following components: (1) a GSG probe to feed the on-chip antenna, (2) a semi-automated wafer-probe station to hold and position the probe, (3) an Agilent vector network analyzer to measure the reflection coefficient ($S_{11}$) of the antenna, (4) a signal generator and (5) the OML extender with a frequency range from 325 to 500 GHz. The calibration process involves two steps: SOLT and TRL calibrations. The SOLT (Short-Open-Load-Through) calibration was initially performed to account for and eliminate errors originating from the VNA (Vector Network Analyzer), cables, and probe. It effectively moves the reference plane to the end of the probe tip. A TRL calibration was then carried out to de-embed the parasitic effects caused by the GSG pads. The second calibration step further moves the reference plane right up to the AUT (antenna-under-test), ensuring an even more accurate measurement by eliminating the interference introduced by the GSG pads. A commercial SOLT calibration kit, the CS-15 calibration substrate from GGB Industries Inc., was used for the SOLT calibration. For the TRL calibration, a TRL kit was custom-designed with the same GSG pad structures and fabricated concurrently with the antenna in the same 65-nm CMOS process. This consistency in design and fabrication ensures the maximum effectiveness of the TRL calibration.

The radiation pattern was measured using a spherical wafer antenna measurement setup. This system mainly includes four components: the transmitter, the feeder, the receiver, and the mechanical parts. The transmitter employs a signal generator and a multiplier chain to generate signals with a frequency range extending up to 500 GHz. The generated THz signal is then fed to the AUT using a specialized RF probe. The receiver is a standard linearly polarized THz waveguide horn connected to a VDI mixer (WR 2.2, 325-500 GHz) located at a far-field distance to capture the signal radiated by the AUT. The received power from the VDI mixer is subsequently relayed to a spectrum analyzer for direct reading. The mechanical arm can rotate in the yoz-plane of the AUT, thereby measuring the radiation pattern. Due to the shadowing of the probe and constraints of the measurement setup, only a part of the yoz-plane pattern is measured. Furthermore, the VDI mixer is mounted on another rotator, facilitating rotation around the mixer itself. In the final stage, the feeder is replaced with a standard horn antenna with a known gain and a connecting 90° waveguide bend to calculate the gain of the AUT, according to the comparison method.

Given that the AUT is CP while the THz horn antenna used for receiving is LP, direct measurements to obtain information such as left-handed CP (LHCP) and right-handed CP (RHCP) gains are not feasible. In such scenarios where a CP antenna is tested with an LP antenna, one typical approach is to use phase-correct measurements of φ and θ-polarization to calculate the RHCP and LHCP components. However, this method requires accurate phase information of the received signal, which is particularly challenging to achieve at THz frequencies. A simpler method is using the multiple-amplitude-component technique, which involves rotating the receiving antenna by 0° (horizontal), 45°, 90° (vertical), and 135°. By collecting amplitude data at these four different angles, AR, RHCP, and LHCP can be calculated. The presented measurement setup incorporates a rotator at the receiving end, enabling precise control over the rotation angle of the receiving LP horn antenna. This significantly simplifies the application of this multiple-amplitude-component method. Once the receiving power for these four angles has been obtained ($P_1$ for 0°, $P_2$ for 90°, $P_3$ for 45°, $P_4$ for) 135°, the tilt angle of the ellipse τ and the axial ratio of the antenna can be calculated using the following equations:

$$\tau = \frac{1}{2}\tan^{-1}\left(\frac{P_3 - P_4}{P_1 - P_2}\right) \tag{11}$$

$$AR = \sqrt{\frac{P_1\cos^2\tau + \frac{1}{2}(P_3 - P_4)\sin 2\tau + P_2\sin^2\tau}{P_1\sin^2\tau - \frac{1}{2}(P_3 - P_4)\sin 2\tau + P_2\cos^2\tau}} \tag{12}$$

The LHCP and RHCP gains can be computed from the following equation:

$$\begin{cases} G_{LHCP} = \dfrac{G_{total}}{2}\cdot\dfrac{(AR+1)^2}{(AR^2+1)} \\ G_{RHCP} = \dfrac{G_{total}}{2}\cdot\dfrac{(AR-1)^2}{(AR^2+1)} \end{cases} \tag{13}$$

where the total gain $G_{total}$ can be computed by the sum of two orthogonal gains, i.e., $G_0+G_{90}$ or $G_{45}+G_{135}$.

Figure 12:
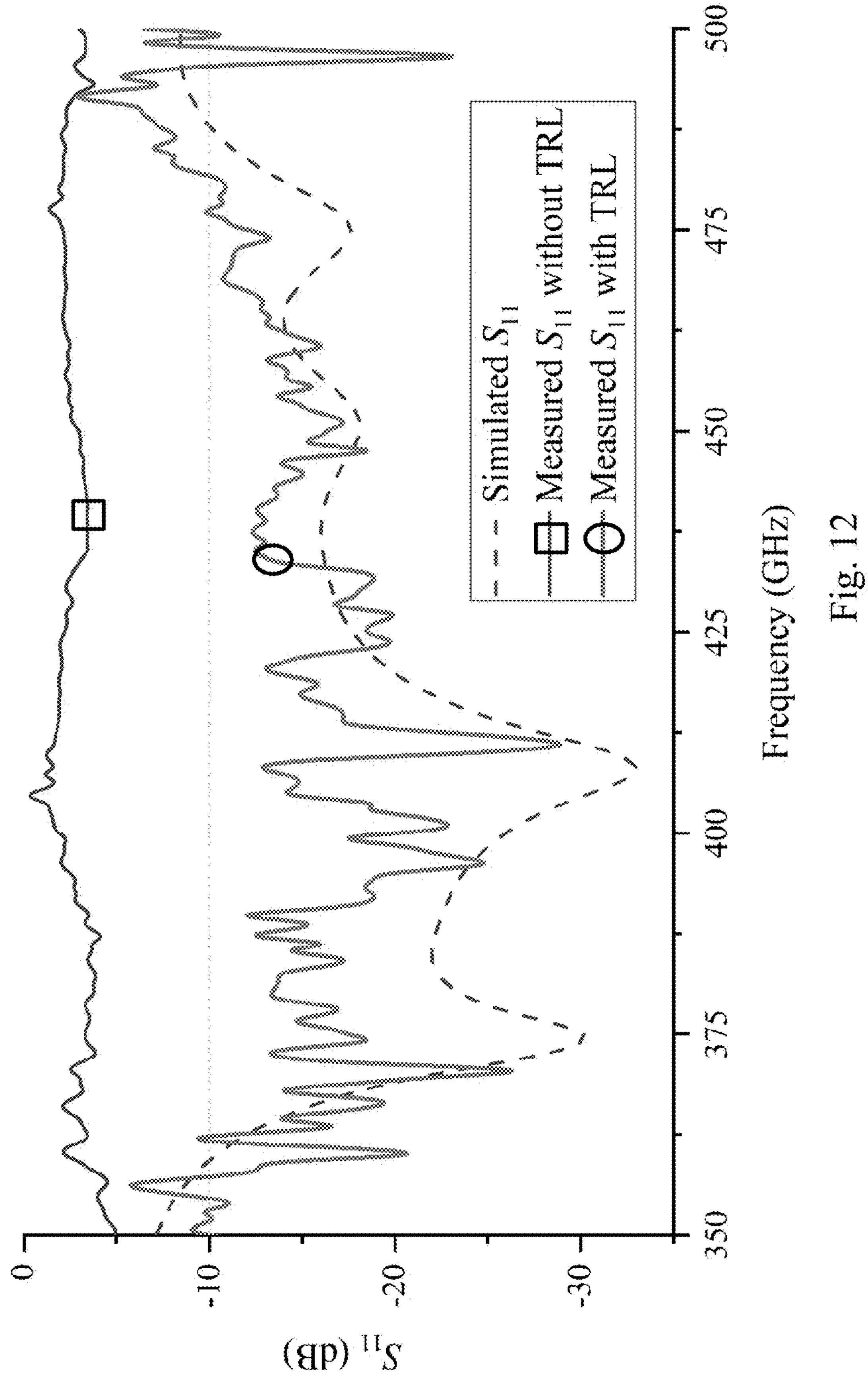
FIG. 12 shows simulated and measured S-parameters of the antenna in FIGS. 1-4*b* before and after TRL (Through-reflect-line) calibration.

FIG. 12 depicts the simulated reflection coefficient and the directly measured one for the fabricated sample. The raw measured reflection coefficient exhibits significant deviation from the simulated result, showing an average $|S_{11}|$ level observed at approximately −5 dB. After the TRL calibration, which utilized the custom-designed TRL kit, the calibrated reflection coefficient (demonstrated by the solid red line) showed a close alignment with the simulation, demonstrating an absolute −10 dB impedance bandwidth of 125 GHz, ranging from 357 to 482 GHz, and a corresponding relative value of 29.4%. However, the calibrated reflection coefficient curve exhibited several irregularities, including some ripples and fluctuations, most notably within the 350 to 420 GHz frequency segment. These discrepancies may be partially attributed to the flaw of the feeding probe after multiple probing. Other potential sources of these observed inconsistencies may include intrinsic coupling and interference arising from the complexity of the feed network, systematic errors in the measurement setup, and environmental interference.

Figure 13A:
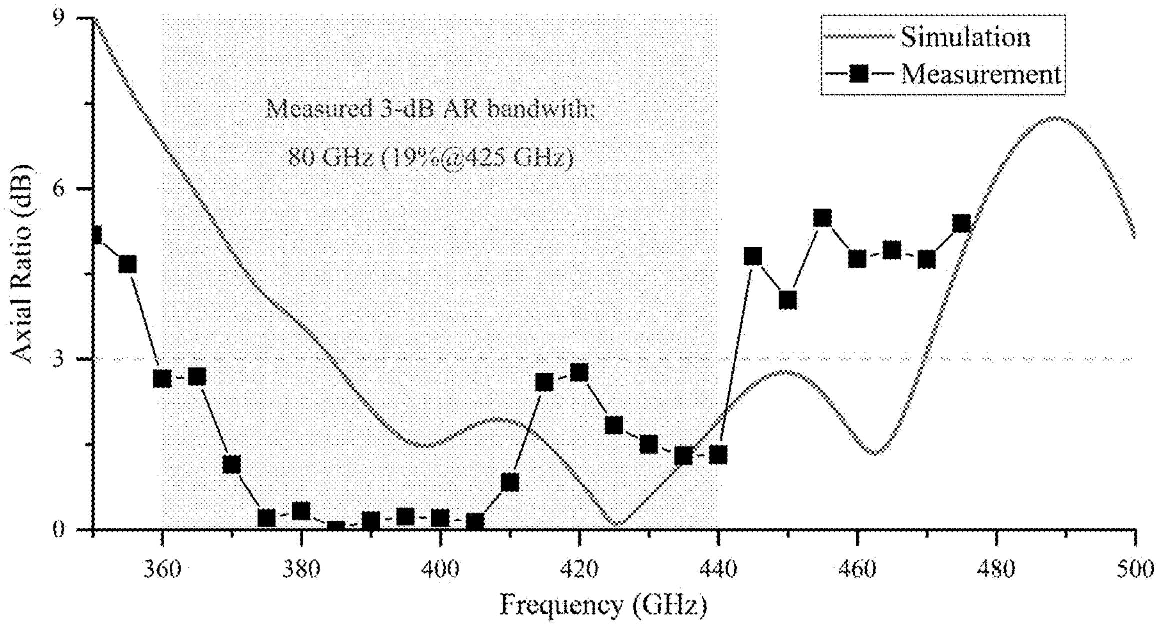
FIG. 13*a* depicts measured and simulated axial ratio curves of the antenna in FIGS. 1-4*b*.

The measured AR at broadside direction over frequency is shown in FIG. 13*a*. The result closely aligns with the simulation in terms of the trends, except for an overall low-frequency shift of about 20 GHz. This indicates some discrepancies in the feed network between the simulation and measurement. This discrepancy could be due to slight changes in the impedance of the parallel plate capacitors and equivalent inductors used in the feed network. The reasons for the change may include differences between the complex CMOS process and the simulation, changes in the dielectric constant, and manufacturing errors. Despite the frequency offset, the antenna achieves an impressive 3-dB AR bandwidth of 19% (center frequency at 425 GHz). Because the antenna's impedance bandwidth entirely encompasses the AR bandwidth, the antenna's overlapped impedance-AR bandwidth also stands at 19%. To the best of the author's knowledge, this is the widest fully integrated on-chip CP antenna in the literature. It is worth emphasizing that this is achieved under a profile of 8.8 μm (only $0.012\lambda_0$). The results validate the excellent performance of the proposed sequential-phase feed network over a wide frequency band, even under an extremely low profile and compact size. This proves that the presented feed network surpasses traditional delay-line-based feed networks in multiple dimensions, including size, performance, and profile. Most importantly, the concept of reactance-loading is versatile, applicable not only in sequential-phase feeding but also in any design requiring phase delay, such as hybrids and couplers. This has significant implications as it offers a flexible and highly efficient solution for achieving wideband phase control while maintaining a highly compact size and low profile.

Figure 13B:
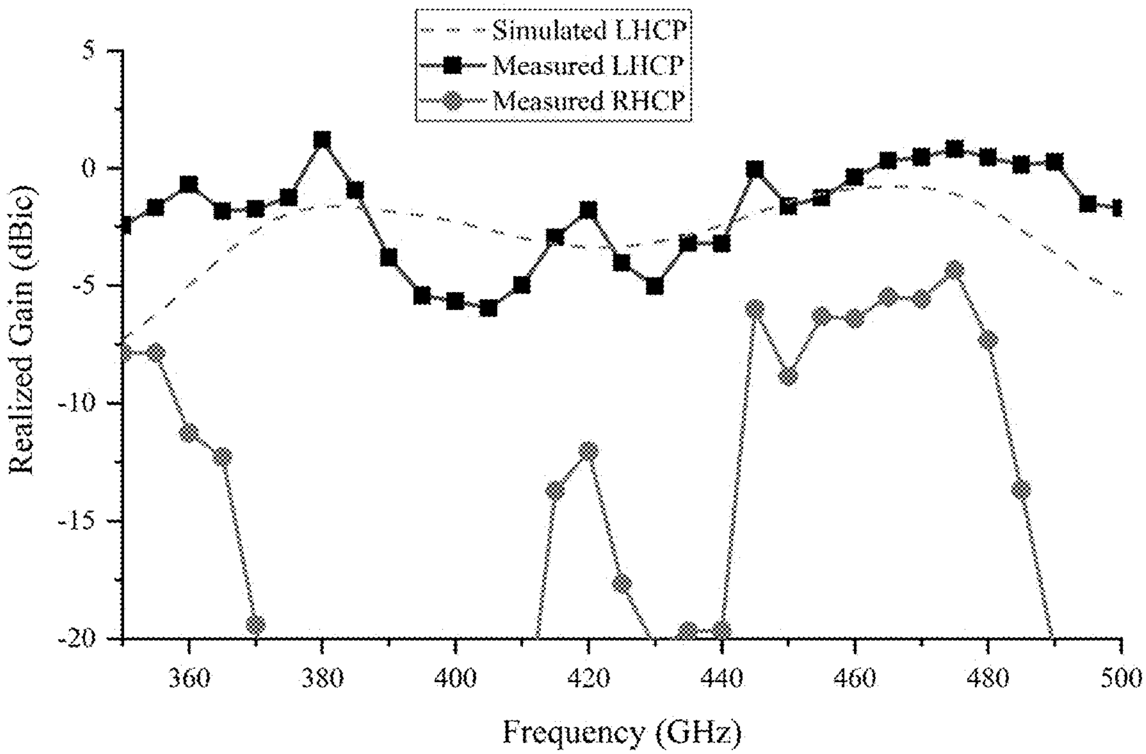
FIG. 13*b* depicts measured and simulated gain curves of the antenna in FIGS. 1-4*b*.
Figure 14A:
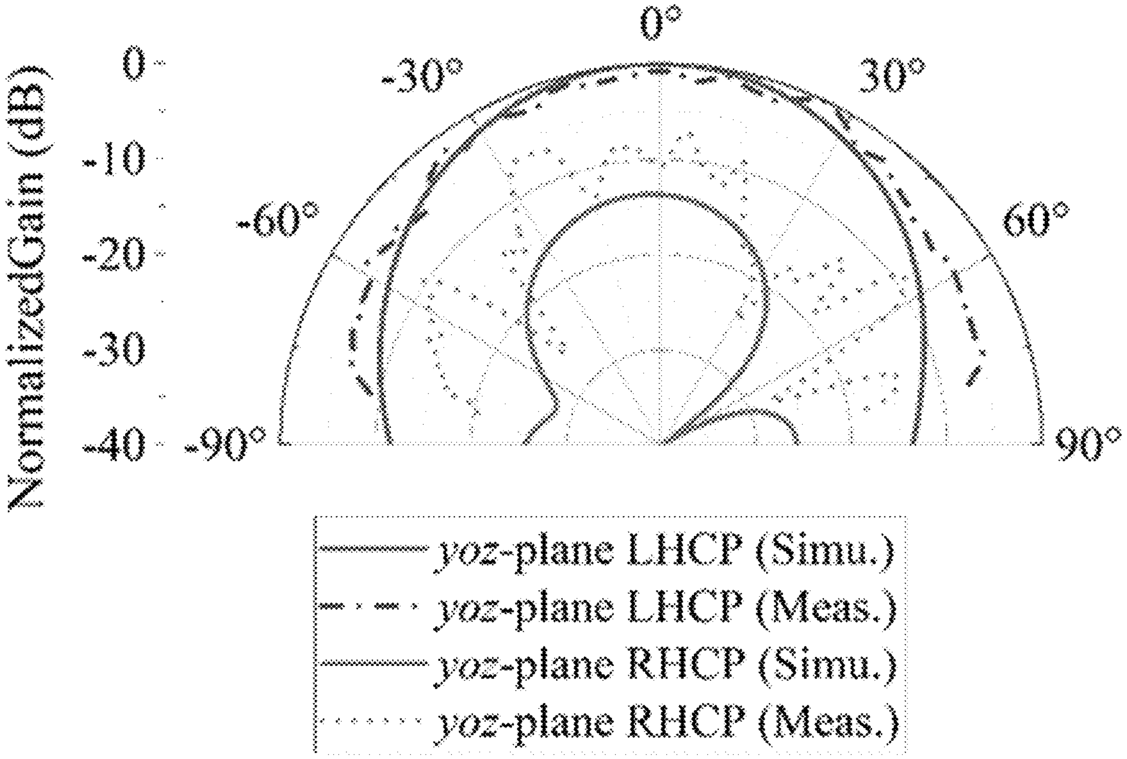
FIG. 14*a* illustrates measured and simulated yoz-plane patterns of the antenna in FIGS. 1-4*b* at 360 GHz.
Figure 14B:
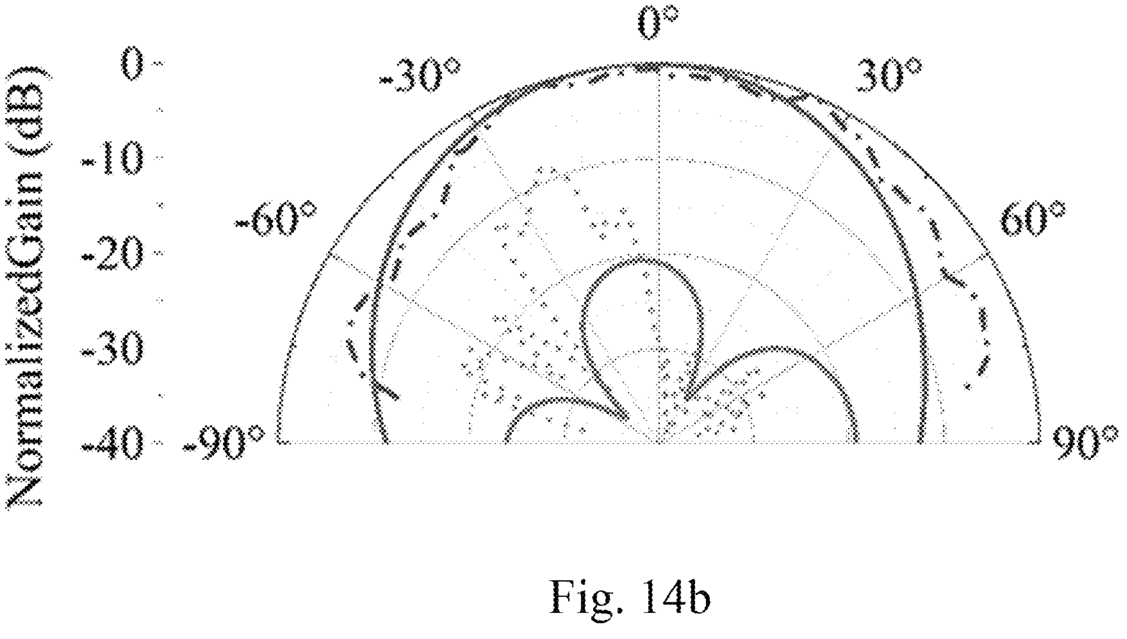
FIG. 14*b* illustrates measured and simulated yoz-plane patterns of the antenna in FIGS. 1-4*b* at 380 GHz.
Figure 14C:
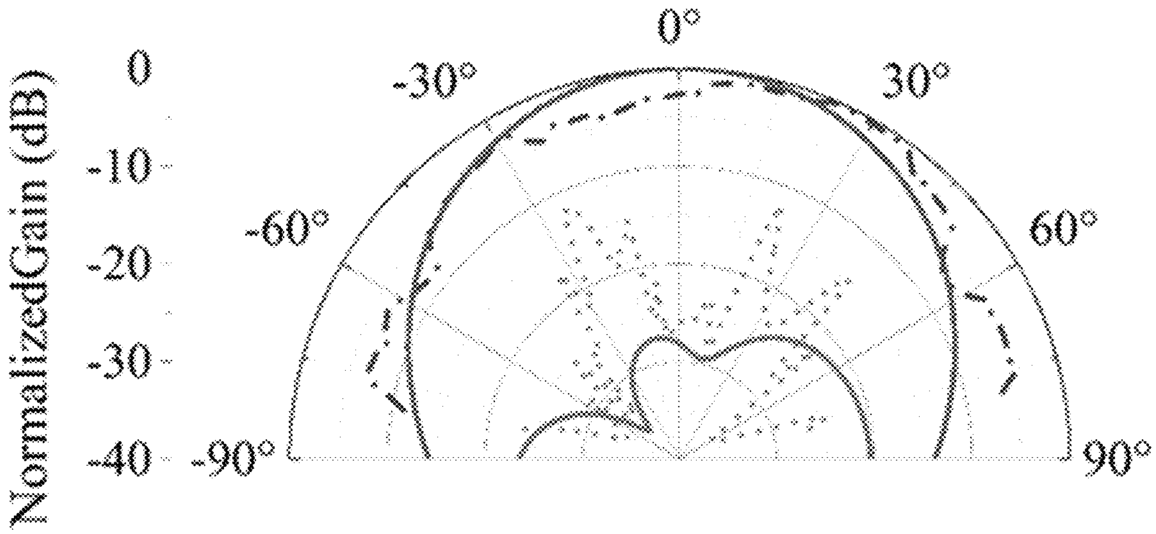
FIG. 14*c* illustrates the measured and simulated yoz-plane patterns of the antenna in FIGS. 1-4*b* at 400 GHz.
Figure 14D:
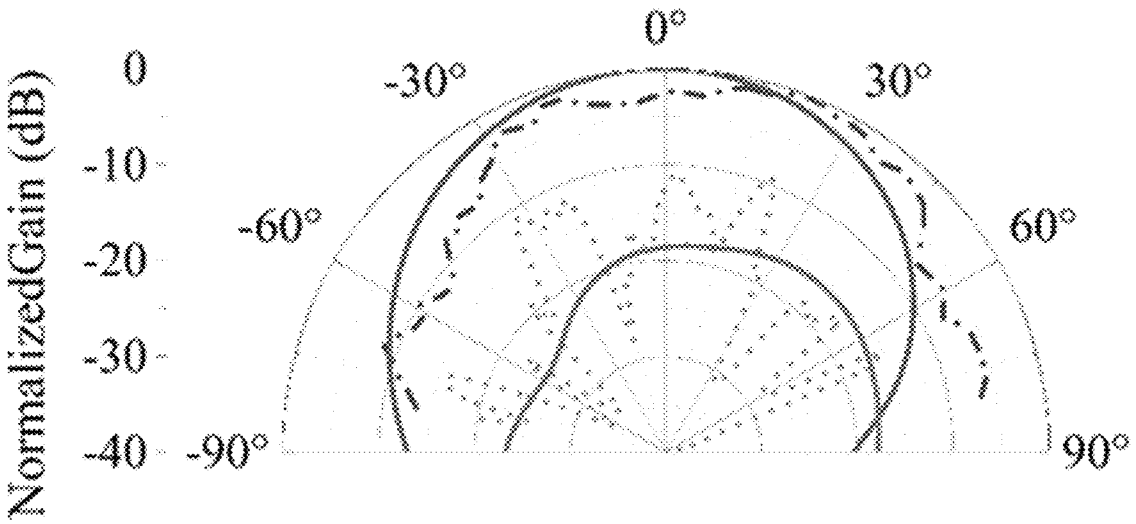
FIG. 14*d* illustrates measured and simulated yoz-plane patterns of the antenna in FIGS. 1-4*b* at 420 GHz.
Figure 14E:
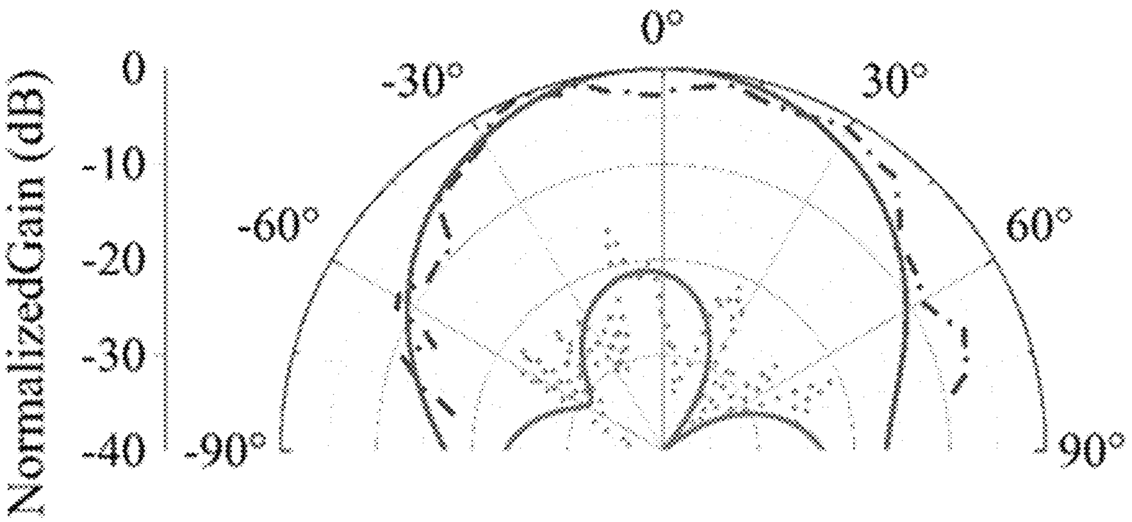
FIG. 14*e* illustrates measured and simulated yoz-plane patterns of the antenna in FIGS. 1-4*b* at 440 GHz.

The measured antenna gain versus frequency curve is shown in FIG. 13*b*. It can be seen that there are certain offsets at the two local maximum points in the measured LHCP curve. The first local maximum, generated by the half $TM_{01}$ mode, shifts towards the lower frequency and reaches a local maximum value of 1.2 dBic at 380 GHz. The second local maximum point, generated by the $TE_{201}$ mode, shifts towards the higher frequency and reaches a local maximum value of 0.8 dBic at 475 GHz. The gain near the local maximum is several dB higher than the simulated gain, but due to the frequency offset, the gain between these two local maximum values shows a significant drop, reaching a local minimum value of −5.9 dBic at 405 GHz. As can be seen, compared with the simulation, the measured gain curve is more fluctuating. Apart from the mentioned reasons, part of the error source may come from the multiple-amplitude-component technique used. As this method requires measurements at different angles, it is possible that certain measurement and system errors are applied multiple times in the calculation, leading to the deterioration of the final result. The calculated RHCP curve is highly consistent with the AR curve, showing low RHCP levels, especially in the frequency range of 360 to 440 GHz, demonstrating the excellent broadband performance of this design.

Due to the 20 GHz frequency offset, when comparing the measured and simulated radiation patterns, the simulated results with a frequency 20 GHz higher than the measured results were used for comparison. The comparison results are shown in FIGS. 14*a*-14*e*. It can be seen that the measured antenna exhibits good LHCP radiation over a wide frequency band while maintaining a low RHCP level. However, there is a certain difference in the RHCP level at 420 GHz, which is mainly due to the overall offset of the AR bandwidth, causing the axial ratio that should be at the local minimum to become the local maximum. Overall, the measured antenna radiation pattern highly overlaps with the simulated results, verifying the excellent LHCP radiation performance of the proposed antenna.

In summary, the antenna in the embodiment of FIGS. 1-4*b* is a 425-GHz wideband on-chip CP antenna incorporating a highly compact reactance-loaded sequential-phase feed network. The antenna involves significant refinements of both the radiating element and the feeding network. By adeptly utilizing the equivalent electric and magnetic walls, the radiating elements have been tuned to resonate in the unique half $TM_{01}$ and quarter $TE_{201}$ modes, thus leading to an expanded impedance bandwidth while maintaining a compact size. In a groundbreaking approach, this design ingeniously exploits the multilayer metals in CMOS technology and integrates reactive components in the feed network to shift the phase. This innovative technique significantly reduced the size of the feed network and offered impressive wideband performance. The final antenna dimensions are a mere $0.55\lambda_0 \times 0.55\lambda_0$, with a low profile of $0.012\lambda_0$. Despite its compact structure, the antenna achieves an overlapped impedance-AR bandwidth of 19% and a maximum gain of 1.2 dBic. Its distinctive advantages, including substantial miniaturization, extremely low profile, and wide impedance and AR bandwidth, make it an appealing candidate in fully integrated THz sensing/imaging and communication applications.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, in the exemplary embodiment shown in FIGS. 1-4*b*, there are four radiating elements, with an input phase difference of 90° between adjacent radiating elements. However, those skilled in the art should understand that there is no limit to the number of radiating elements or the input phase difference for the CP antennas according to the invention. For example, the invention may be applied to a circularly polarized antenna consists of four to eight radiating elements organized in a rotationally symmetric pattern.

In the exemplary embodiments described above, there are three equivalent capacitors in the feed network, and one equivalent inductor in the feed network. However, the invention should not be confined to any particular numbers of inductors and capacitors. For example, depending on the number of radiating elements there could be more or less capacitors and/or inductors.

The antenna in the exemplary embodiment shown in FIGS. 1-4*b* is intended for operating at 425 GHz and fabricated using 65-nm CMOS technology. However, the invention is not limited to any particular frequency spectrum or fabrication technology. Rather, the invention could apply to other frequency bands or semiconductor fabrication processes. For example, the International Telecommunication Union (ITU) WRC-19 agenda item 1.15 is considering the frequency range from 275-450 GHz for the next generation land wireless and fixed service applications.

The invention claimed is:

1. A circularly polarized antenna, comprising:

a) a plurality of radiating elements configured in a rotationally symmetric pattern;

b) a feed network connected to the plurality of radiating elements; the feed network comprising:

i) a core portion comprising a parallel-plate capacitor; and ii) a plurality of output arms each corresponding to one of the plurality of radiating elements; the plurality of output arms coupled to the core portion;

wherein the plurality of output arms is configured in a rotationally symmetric pattern.

2. The circularly polarized antenna of claim 1, wherein the core portion has a substantial square-ring shape.

3. The circularly polarized antenna of claim 2, wherein the core portion has unequal widths along a direction of extension of the core portion.

4. The circularly polarized antenna of claim 1, wherein the parallel-plate capacitor is located in front of a corresponding one of the output arms along a signal transmission path of the circularly polarized antenna.

5. The circularly polarized antenna of claim 1, wherein the parallel-plate capacitor comprises a first portion located in a same layer as remaining part of the core portion, as well as a second portion parallel to and located below the first portion.

6. The circularly polarized antenna of claim 5, wherein the output arms are in the same layer as the first portion of the parallel-plate capacitor.

7. The circularly polarized antenna of claim 1, comprising four said radiating elements, with a 90° input phase difference between adjacent said radiating elements; the circularly polarized antenna comprising three said parallel-plate capacitors corresponding to first three said radiating elements along a signal transmission path of the circularly polarized antenna.

8. The circularly polarized antenna of claim 1, wherein the core portion is fed by a feeding line that extends in a same layer as the core portion.

9. The circularly polarized antenna of claim 8, wherein the feeding line extends along a first direction; the core structure being shorted by a shorting line which extends along a second direction that is perpendicular to the first direction.

10. The circularly polarized antenna of claim 9, wherein the shorting line passes through a shorting via formed at substantially a center of the core portion, and connects to a ground layer below the feed network.

11. The circularly polarized antenna of claim 1, wherein each of the plurality of radiating elements comprises:

i) a patch element; and ii) a shorting wall connected to the patch element and adapted to short the same.

12. The circularly polarized antenna of claim 11, further comprising a ground layer; for each said radiating element the shorting wall being positioned between a corresponding patch element and the ground layer, and connected to both the patch element and the ground layer.

13. The circularly polarized antenna of claim 12, wherein the shorting wall comprises a plurality of layers.

14. The circularly polarized antenna of claim 13, wherein the shorting wall comprises ten layers.

15. The circularly polarized antenna of claim 11, wherein the patch element of each said radiating elements has a substantially rectangular shape.

16. The circularly polarized antenna of claim 15, wherein for each said radiating element the shorting wall connects to the patch element substantially at a first side of the patch element; the feed network connected to the patch element substantially at a second side of the patch element that is opposite to the first side.

17. The circularly polarized antenna of claim 15, wherein for each said radiating element a projection of the shorting wall on the patch element has a substantially "T" shape; the shorting wall having a first segment connected to the patch element at a first side thereof, and a second segment perpendicular to the first segment and extending from the first segment toward a center of the patch element.

18. The circularly polarized antenna of claim 17, wherein each of the output arms extends along a direction substantially parallel to that of a corresponding one of the first segments.

19. The circularly polarized antenna of claim 17, wherein the first segment of the shorting wall has the same length as a dimension of the first side of the patch element.

20. The circularly polarized antenna of claim 15, wherein the patch element of each said radiating element is formed with a rectangular notch at a corner of the rectangular shape; the feed network connected to the patch element near the rectangular notch.

21. The circularly polarized antenna of claim 15, wherein for each said radiating element the ground layer is formed with a respective aperture that has a shape corresponding to that of the shorting wall; the aperture receiving partially the shorting wall therein.

22. The circularly polarized antenna of claim 11, comprising four said radiating elements, with a 90° input phase difference between adjacent said radiating elements.

* * * * *